United States Patent
Gvili

(10) Patent No.: US 12,413,561 B2
(45) Date of Patent: Sep. 9, 2025

(54) MANICODING FOR COMMUNICATION VERIFICATION

(71) Applicant: Yaron Gvili, Ra'anana (IL)

(72) Inventor: Yaron Gvili, Ra'anana (IL)

(*) Notice: Subject to any disclaimer, the term of this patent is extended or adjusted under 35 U.S.C. 154(b) by 0 days.

(21) Appl. No.: 18/542,062

(22) Filed: Dec. 15, 2023

(65) Prior Publication Data

US 2024/0305613 A1    Sep. 12, 2024

Related U.S. Application Data

(63) Continuation of application No. 17/811,799, filed on Jul. 11, 2022, now Pat. No. 11,848,920, which is a continuation of application No. 16/863,981, filed on Apr. 30, 2020, now Pat. No. 11,388,152, which is a continuation of application No. 15/967,018, filed on Apr. 30, 2018, now abandoned, which is a continuation of application No. 15/688,298, filed on Aug. 28, 2017, now Pat. No. 9,961,050, which is a continuation of application No. 14/539,181, filed on Nov. 12, 2014, now Pat. No. 9,749,297.

(51) Int. Cl.
*H04L 9/40* (2022.01)

(52) U.S. Cl.
CPC ...... *H04L 63/0428* (2013.01); *H04L 63/0442* (2013.01); *H04L 63/061* (2013.01); *H04L 63/10* (2013.01); *H04L 63/1408* (2013.01)

(58) Field of Classification Search
CPC ............... H04L 63/0428; H04L 63/10; H04L 63/0442; H04L 63/061; H04L 63/1408
USPC ...................................................... 713/170
See application file for complete search history.

(56) References Cited

U.S. PATENT DOCUMENTS

| | | | |
|---|---|---|---|
| 4,200,770 A * | 4/1980 | Hellman ............... | H04L 9/0844 713/169 |
| 6,396,928 B1 * | 5/2002 | Zheng ................... | H04L 9/3247 713/168 |

(Continued)

OTHER PUBLICATIONS

Ian Miers, Zerocoin: Anonymous Distributed E-Cash from Bitcoin, Johns Hopkins University Department of Computer Science, IEEE 2013 (Year: 2013).*

(Continued)

*Primary Examiner* — Samson B Lemma
(74) *Attorney, Agent, or Firm* — Brake Hughes Bellermann LLP

(57) ABSTRACT

Verifiable, secure communications between a sender and a receiver on at least one shared communication channel is provided. A manicoded key encoder produces an argument of knowledge for a secret key to the at least one shared communication channel, and a manicoded message encoder provides an implication argument indicating that knowledge of the secret key enables access to message content of the manicoded message. The argument of knowledge is included in a key manifest for the secret key within a manicoded key, and the implication argument is included in a message manifest of a manicoded message. In this way, the sender may provide message content within the manicoded message, and the receiver may operate a decoder to access the message content. A verifier may use the manicoded key and the manicoded message to verify that the receiver has access to the message content.

21 Claims, 12 Drawing Sheets

(56) References Cited

U.S. PATENT DOCUMENTS

| | | | | |
|---|---|---|---|---|
| 7,047,415 B2* | 5/2006 | Doyle | ................ | H04L 63/12 |
| | | | | 713/161 |
| 7,353,204 B2* | 4/2008 | Liu | ................ | G06Q 20/3829 |
| | | | | 705/50 |
| 8,726,009 B1* | 5/2014 | Cook | ................ | H04L 9/083 |
| | | | | 713/168 |
| 2002/0112157 A1* | 8/2002 | Doyle | ................ | H04L 9/007 |
| | | | | 713/157 |
| 2002/0129241 A1* | 9/2002 | Doyle | ................ | H04L 9/3265 |
| | | | | 713/157 |
| 2002/0143710 A1* | 10/2002 | Liu | ................ | G06Q 20/3829 |
| | | | | 705/54 |
| 2012/0284508 A1* | 11/2012 | Zaverucha | ............ | H04L 9/3263 |
| | | | | 713/156 |

OTHER PUBLICATIONS

Satoshi Nakamoto, Bitcoin: A Peer-to-Peer Electronic Cash System, www.bitcoin.org, 2008 (Year: 2008).*

* cited by examiner

200

---

Receive a manicoded key from at least one shared communication channel, the manicoded key including a key manifest for a secret key, the key manifest providing an argument of knowledge for the secret key
202

↓

Receive a manicoded message from the at least one shared communication channel, the manicoded message including a message manifest for the secret key, the message manifest including an implication argument indicating that knowledge of the secret key enables access to message content of the manicoded message
204

↓

Compare the key manifest and the message manifest to establish that an owner of the secret key and the manicoded message has the access to the message content
206

FIG. 2

MANICODING FOR COMMUNICATION VERIFICATION

CROSS REFERENCE TO RELATED APPLICATIONS

This application is a continuation application and claims the benefit of U.S. application Ser. No. 17/811,799, filed on Jul. 11, 2022 and titled "MANICODING FOR COMMUNICATION VERIFICATION", which is a continuation application and claims the benefit of U.S. application Ser. No. 16/863,981, filed on Apr. 30, 2020 and titled "MANICODING FOR COMMUNICATION VERIFICATION", now U.S. Pat. No. 11,388,152, which is a continuation application and claims the benefit of U.S. application Ser. No. 15/967,018, filed on Apr. 30, 2018 and titled "MANICODING FOR COMMUNICATION VERIFICATION", which is a continuation application and claims the benefit of U.S. application Ser. No. 15/688,298, filed on Aug. 28, 2017 and titled "MANICODING FOR COMMUNICATION VERIFICATION", now U.S. Pat. No. 9,961,050, which is a continuation application and claims the benefit of U.S. application Ser. No. 14/539,181, filed on Nov. 12, 2014 and titled "MANICODING FOR COMMUNICATION VERIFICATION", now U.S. Pat. No. 9,749,297, all of which are incorporated herein by reference in its entirety.

TECHNICAL FIELD

This description relates to secure communications.

BACKGROUND

Conventional systems and techniques exist for securing individual communications between two or more entities exchanging such communications. Particularly, in the realm of digital communications, it is often highly likely that a communication can potentially be intercepted or otherwise illicitly obtained by a recipient who is not an intended recipient thereof. Such messages must therefore be secured, so that the unintended recipient will be unable to inspect or alter message content contained therein.

For example, a message to be sent from a transmitting entity to a receiving entity may be encoded in a manner which attempts to ensure that only the intended recipient(s) will be able to decode the message and obtain the message content therein. Thus, even if the encoded message is transmitted in a manner that is accessible to unintended recipients (e.g., is sent over the public Internet), the unintended recipients will be unable to obtain or alter the actual message content being communicated. The many known techniques for implementing public/private key cryptography provide specific examples of such scenarios, and other examples are also known.

In many scenarios, however, it is difficult or impossible for a third party to verify successful completion of such secure communications, or aspects thereof. Consequently, in scenarios in which such third-party verification would be necessary or helpful, undesirable levels of cost and effort must be expended, or the desired verification may have to be abandoned entirely, or may not be sufficiently reliable. In such scenarios, then, profits and efficiencies may be reduced, and message security may be compromised.

SUMMARY

According to one general aspect, a computer program product includes instructions recorded on a non-transitory computer readable storage medium and configured, when executed by at least one processor, to cause the at least one processor to receive a manicoded key from at least one shared communication channel, the manicoded key including a key manifest for a secret key, the key manifest providing an argument of knowledge for the secret key. The instructions, when executed by the at least one processor, further cause the at least one processor to receive a manicoded message from the at least one shared communication channel, the manicoded message including a message manifest for the secret key, the message manifest including an implication argument indicating that knowledge of the secret key enables access to message content of the manicoded message, and compare the key manifest and the message manifest to establish that an owner of the secret key and the manicoded message has the access to the message content.

According to another general aspect, a method includes receiving a manicoded key from at least one shared communication channel, the manicoded key including a key manifest for a secret key, the key manifest providing an argument of knowledge for the secret key. The method includes receiving a manicoded message from the at least one shared communication channel, the manicoded message including a message manifest for the secret key, the message manifest including an implication argument indicating that knowledge of the secret key enables access to message content of the manicoded message. The method also includes comparing the key manifest and the message manifest to establish that an owner of the secret key and the manicoded message has the access to the message content.

According to another general aspect, a verifier system includes instructions stored on a non-transitory computer readable storage medium and executable by at least one processor. The verifier system includes a key manifest interpreter configured to cause the at least one processor to receive a manicoded key from at least one shared communication channel, the manicoded key including a key manifest for a secret key, the key manifest providing an argument of knowledge for the secret key. The verifier system includes a message manifest interpreter configured to cause the at least one processor to receive a manicoded message from the at least one shared communication channel, the manicoded message including a message manifest for the secret key, the message manifest including an implication argument indicating that knowledge of the secret key enables access to message content of the manicoded message. The verifier system also includes a manifest comparator configured to cause the at least one processor to compare the key manifest and the message manifest to establish that an owner of the secret key and the manicoded message has the access to the message content.

The details of one or more implementations are set forth in the accompanying drawings and the description below. Other features will be apparent from the description and drawings, and from the claims.

BRIEF DESCRIPTION OF THE DRAWINGS

FIG. 2 is a flowchart illustrating example operations of the system of FIG. 1.

DETAILED DESCRIPTION

Figure 1:
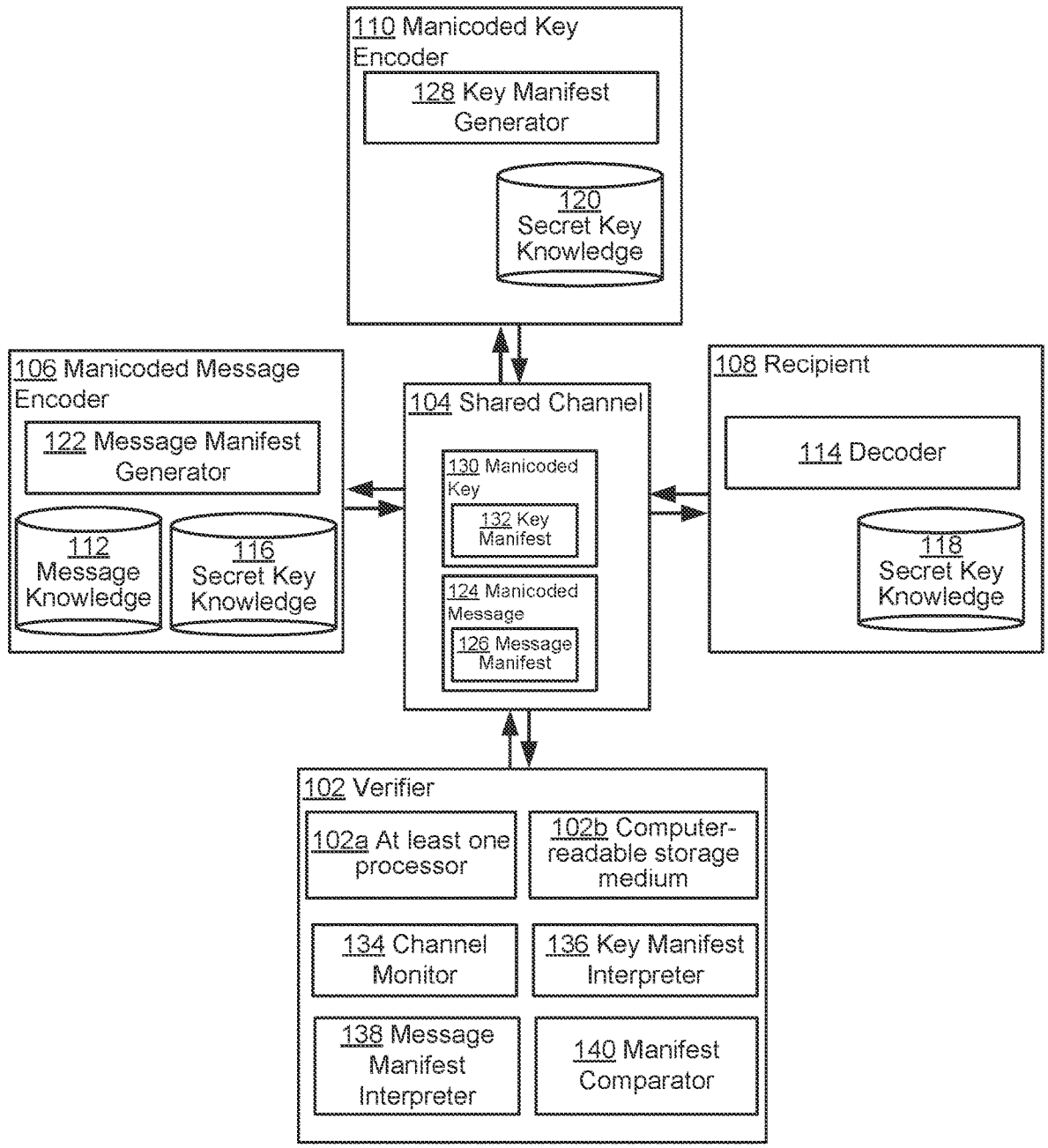
FIG. 1 is a block diagram of a system for manicoding for communication verification.

FIG. 1 is a block diagram of a system 100 for manicoding for communication verification. In the system 100, a verifier 102 is configured to utilize a shared channel 104 to provide de-centralized verification for communications between a manicoded message encoder 106 and a recipient 108, utilizing a manicoded key encoder 110. As described in detail below, such verifiable communications provide advantages in a number of scenarios, including, e.g., restricting or eliminating an ability of the recipient 108 to deny receipt of communications (or knowledge of content thereof), facilitating commerce involving digital goods, providing corroboration of accurate/genuine information being communicated, providing validation of overridable contracts (such as a will), enabling verifiable auctions, and enabling an exercise of parties' rights to be forgotten. Moreover, the verification techniques described herein may be operated in a de-centralized manner, easily implementable by virtually any entity wishing to obtain verification, and without requiring the use of a trusted third party. These and various other uses and advantages of the system 100, and related systems, are described in detail below, or would be apparent from the following description.

Within the following description, the term(s) "manicode", "manicoded", "manicoding", and variations thereof, should be understood generally to refer to encoding/decoding techniques for message knowledge 112, where such techniques involve the use of at least two manifests published to the shared channel 104 (e.g., a message manifest 126 and a key manifest 132 of FIG. 1, as described in detail, below). For example, such manifests may be provided on the shared channel 104 by the manicoded message encoder 106 and the manicoded key encoder 110, and may be utilized in combination by the verifier 102 to provide the types of communication verification just referenced, and described in detail herein. It will be appreciated that these terms are used for clarity and consistency, but that other appropriate terminology could be used to describe the same or similar concepts.

It is assumed for purposes of the example of FIG. 1 that the manicoded message encoder 106 has access to the message knowledge 112 that is to be provided in a secure, verifiable fashion to the recipient 108. Thus, the manicoded message encoder 106 may be understood to encode the message knowledge 112 (e.g., encode message content thereof). In many embodiments, the message knowledge 112 may represent a specific message to be encoded, and the message knowledge 112 may thus be referred to herein as the message 112. In other embodiments, the message knowledge 112 may represent a partial message, or some other aspect related to message content to be encoded, e.g. such that the message content is created interactively between the parties 106, 108, 110. In some embodiments, the manicoded message encoder 106 may encode message content that is related to underlying, source message content. That is, in many cases, the message content being encoded may be identical to the source message content, but in other examples, there may be a different relationship between the source message content (e.g., an original message) and the message content that is actually encoded by the encoder 106 for decoding by a decoder 114. For example, the manicoded message encoder 106 may execute a blind encoding of the source message content, e.g., may not have full knowledge of, or access to, the source message content, and instead may encode message content having some pre-defined relationship to the source message content. More specifically, for example, as discussed below, e.g., with respect to FIGS. 14 and 15, a subsequent message owner may execute such a blind signature for source message content of an original message owner.

The recipient 108 is illustrated as including the decoder 114 that is operable to decode the encoded message 112. Specific examples of such message encoding/decoding, by themselves, are well-known. Nonetheless, a number of examples thereof are provided herein, where necessary or helpful to understand operations of the system 100. Of course, it will be appreciated that such example encoding/decoding techniques are not exhaustive or limiting, and many other known or future techniques for performing such message encoding/decoding may be used, as would be apparent from the present description.

In the example of FIG. 1, each of the encoders 106, 110 and the recipient 108 are illustrated as having access to secret key knowledge related to at least one secret key used to enable the secure, verifiable communications described herein. Specifically, as shown, the manicoded message encoder 106 has access to secret key knowledge 116, the recipient 108 has access to secret key knowledge 118, and the manicoded key encoder 110 has access to secret key knowledge 120.

In several example embodiments, the secret key knowledge 116, 118, 120 may each represent a secret key that is fully available to all of the encoders 106, 110 and the recipient 108. In other example embodiments, however, it may occur that the secret key knowledge 118 of the recipient 108 represents a secret key known only to the recipient 108, while the secret key knowledge 116, 120 represent(s) partial or incomplete knowledge of that secret key. In still other example embodiments, it may occur that none of the encoders 106, 110 and the recipient 108 have complete knowledge of the secret key, and, instead, the secret key is created interactively between the parties 106, 108, 110 without any one of them having complete knowledge thereof.

Many such various embodiments are described in detail below, or would be apparent to one of skill in the art. For purposes of this description, and based on the preceding explanation, it will be appreciated that any operation(s) of the system 100 described as being "based on the secret key" or "using the secret key," or similar, should be understood to make direct or indirect use of one or more such secret key(s), based on complete, incomplete, or related knowledge thereof by any particular entity.

Also, in various implementations, as described herein, the message knowledge 112 may be used as, or used to provide, a secret key of the type just referenced. Conversely, in some implementations, such a secret key may be transmitted as including message content. For example, a message encoded using a first secret key may serve as a second secret key for a subsequent, second message. Thus, it may be appreciated that, in many embodiments, there may be little or no technical difference(s) between the message knowledge 112 and the secret key knowledge 116, 118, 120; rather, the message knowledge 112 and the secret key knowledge 116, 118, 120 may differ primarily in a manner in which each is used/interpreted by encoders 106, 110, the decoder 114, and the verifier 102 (e.g., one or both of the interpreters 136, 138).

Further in the example of FIG. 1, the shared channel 104 may represent virtually any communications channel that is accessible by all of the entities/modules 102, 106, 108, 110. For example, the shared channel 104 may represent a publicly-available communications medium, such as the public Internet (e.g., a specific domain thereon). Similarly, the shared channel 104 may represent a secure channel (e.g., a virtual private network, or VPN) on the public Internet, that is accessible only to authorized parties. In other examples, the shared channel 104 may represent a private network, such as a private local area network (LAN) or private wide area network (WAN). The shared channel 104 may include or represent a hard-wired connection between the entities/modules 102, 104, 106, 108 (and other authorized parties).

In practice, then, the shared channel 104 may represent virtually any wired or wireless communications medium that may be used by any one of the entities/modules 102, 106, 108, 110 to post, publish, or otherwise provide information to be accessible for reading and use thereof by any of the remaining one(s) thereof. In some implementations, the shared channel 104 should be understood to represent two or more such channels, and examples of such implementations are provided, below. Techniques for exchanging information with such a shared channel(s), or therebetween, are generally well-known. Consequently, although various examples of such techniques are referenced below for the sake of illustration and understanding, it will be appreciated that such examples are neither exhaustive nor limiting.

The manicoded message encoder 106 may thus represent, or include, virtually any terminal (and associated hardware/software) that may be connected to the shared channel 104. As already referenced, the manicoded message encoder 106 may be configured to provide various types of encoding with respect to the message 112, e.g., based on the secret key knowledge 116, to thereby obtain a manicoded message 124.

The manicoded message encoder 106 is also illustrated as including a message manifest generator 122, which, as referenced above, is configured to provide a message manifest 126 that is included in, or otherwise associated with, the manicoded message 124, and that is based on the secret key for the secret key knowledge 116. As described in detail herein, the message manifest 126 is created by the message manifest generator 122 based on the secret key knowledge 116, and, among other features and functions, facilitates verification operations of the verifier 102.

Specifically, the manicoded key encoder 110 is configured to provide a manicoded key 130, and includes a key manifest generator 128 configured to provide a key manifest 132 that is included in, or otherwise associated with, the manicoded key 130, and that is based on the secret key for the secret key knowledge 120. As described in detail below, the manicoded key 130, in conjunction with the key manifest 132, provides an argument of knowledge that an owner or possessor of the secret key (or certain associated secret key knowledge) is capable of decoding the manicoded message 124 and thereby obtaining the message content of the message 112.

In other words, for example, when both the manicoded key 130 and the manicoded message 124 are present on the shared channel 104 (e.g., at the same time, or at different times), a result is that the verifier 102 is able to verify that any recipient in possession of the manicoded message 124, and in the possession of the secret key knowledge 118 (such as the recipient 108, as shown) has the ability to decode the manicoded message and gain possession of message content of the message 112. Put another way, the verifier 102 can thus verify that the recipient 108 has access to such message content, and the recipient 108 loses the ability to deny having this access. Put yet another way, one or more entities implementing verifier 102 may be said to consistently update their beliefs as a result of such verification, so that operations of the verifier 102 therefore may be viewed as a process of belief synchronization between such entities.

For example, a provider of the manicoded message encoder 106 may wish to serve the recipient 108 with a particular document (e.g., a legal notice, such as a court order). The manicoded message encoder 106 may thus publish the manicoded message 124 with the message manifest 126 to the shared channel 104. If the manicoded key 130 and the key manifest 132 are also present on the shared channel 104 and associated with an identity of the recipient 108 (as described in detail, below), then the verifier 102 can verify that the recipient 108 has the ability not only to receive the legal notice, but also to decode and thus possess the content thereof. In such examples, as referenced above and also discussed below, the manicoded key encoder 110 may be implemented by the manicoded message encoder 106, by the recipient 108 (e.g., where the recipient 108 has a legal or business obligation to do so), or by a separate entity.

In the above example, as referenced, it is assumed that an identity of the recipient 108 is known. In general, as described below, such identity information may be included within, or associated with, the key manifest 132. In other examples, recipient identity information may be provided separately, or, in still other examples, it may occur that no such identity information is provided. In the latter examples, the verifier 102 may utilize the manicoded key 130 and the manicoded message 124 to verify that any entity with access to the shared channel 104 and possession of secret key knowledge 118 will have access to the message content of the message 112, even though such a recipient entity may not be uniquely or individually identified at the time, or may not even exist at the time.

For example, such a recipient entity may not have possession of the secret key knowledge 118 at the time that the manicoded key 130 and the manicoded message 124 have both been posted to the shared channel 104, but may come into possession at a later time. Similarly, such a recipient entity may have possession of the secret key knowledge 118, but may not have demonstrated or argued such knowledge at the time that the manicoded key 130 and the manicoded message 124 have both been posted to the shared channel 104. Thus, the recipient 108 of FIG. 1 should generally be understood to represent all such potential recipient entities (e.g., unidentified, unknown, not yet existing, and/or not yet in possession of the secret key knowledge 118).

In some implementations, the key manifest 132 and/or the message manifest 126 may be used to convey additional properties of the manicoded key 130 and/or the manicoded message 124. For example, one or both of the manifests 132, 126 may be used to provide properties, characteristics, portions, or metadata of the message 112, without revealing the actual message content of the message 112. Throughout the present description, the meaning of "without revealing" some secret, confidential, or protected knowledge, is that no (or negligible or non-useful) information beyond what is conveyed by the corresponding manifest is revealed about the secret, confidential, or protected knowledge.

In this way, the verifier 102, in addition to verifying knowledge of the message content by the recipient 108, may verify aspects of the message content without actually gaining possession thereof. For example, an entity implementing the manicoded message encoder 106 may wish to sell a digital photograph or other digital element to the recipient 108, and may wish to enable verification of such a transaction (and aspects thereof), without revealing the content of the image to the verifier 102. In this way, the selling entity may retain rights in the digital image or other content for future sales thereof, while any verifying entity may still verify that images/content already sold was valid, complete, and/or authentic.

Similarly, the manifests 126 and/or 132 may be used to provide characteristics or metadata related to other aspects of the manicoded key 130, the manicoded message 124, or of the communication of these by way of the shared channel 104. For example, one or both of the manifests 132, 126 may include a characterization of security techniques used to encode the manicoded message 124, e.g., so as to support an argument that the message content is sufficiently secure. Other examples of uses of the manifests 132, 126 are provided below, or would be sufficient.

In operation, the verifier 102 executes an included channel monitor 134 that is configured to monitor the shared channel 104 and obtain manicoded keys and manicoded messages therefrom. A nature of the channel monitor 134 will generally depend on a corresponding nature of the shared channel 104, but, in general, it will be appreciated that the channel monitor 134 is capable of executing both active and passive monitoring of the shared channel 104, as well as any matching or corresponding operations needed to relate (possibly overlapping) pairs of manicoded keys/messages. In the latter case(s), for example, such matching operations may include matching a message serving as a secret key for a second message, with that second message. Thus, matching(s) of pairs of manicoded keys/messages (and associated manifests) may overlap in the sense that any given key or message may participate in more than one matching operation.

Further, it will be further appreciated from the various implementations that, in many cases, some or all of the entities providing the encoders 106, 110 and the recipient 108 will have an interest in facilitating such matching operations of the verifier 102. That is, the various entities will generally desire enabling the channel monitor 134 to obtain/detect a matching manicoded key and manicoded message from among a potentially large number of such manicoded keys/messages available on the shared channel.

For example, with reference to the above scenarios, a party serving a legal notice will wish to enable verification that the legal notice has been served, and the party selling digital goods will wish to enable verification that authentic goods have been sold and delivered. Therefore, such parties may actively transmit the manicoded key 130 and the manicoded message 124 (or notifications thereof) to the verifier 102. In other scenarios, the channel monitor 134 may proactively monitor the shared channel 104 at predetermined times, or in response to defined events. In all such cases, it is assumed that the manicoded key 130 and the manicoded message 124 are associated with an identifier(s) which enables matching thereof.

Thereafter, a key manifest interpreter 136 may be configured to process the key manifest 132 and obtain the types of information referenced above therefrom. Similarly, a message manifest interpreter 138 may be configured to process the message manifest 126 and obtain the types of information referenced above therefrom, as well. Then, a manifest comparator 140 may be configured to match or otherwise compare the interpreted information and determine that any recipient 108 (who may or may not be identified as such within the manifests 126, 132, as described) in possession of the secret key knowledge 118 will have knowledge of, or otherwise have access to, message content of the message 112. As also just described, the manifest interpreters 136, 138 may provide any additional information contained therein, such as an identity of the recipient 108, characteristics of the message content or of the message 112, security techniques used in encoding/decoding the message 112, or other additional information, some types of which are described herein.

Many different implementations and usage scenarios (and aspects thereof) may be realized with respect to the system 100, in addition to those referenced above, using variations of, and/or supplements to, the features and functions already described. For example, in some scenarios, the manicoded message 124 may be posted earlier in time than the manicoded key 130, so that the manicoded message 124 can be viewed as a commitment to send the message 112. Then, any recipient 108 who posts the manicoded key 130 (i.e., by implementing the manicoded key encoder 110), effectively acknowledges receiving and decoding the message 112. Conversely, in scenarios in which the recipient 108 posts the manicoded key 130 at a point in time prior to posting of the manicoded message 124, the recipient 108 makes a commitment to receiving and decoding and acknowledging at a later time any matching manicoded message 124 that the manicoded message encoder 106 may post to the shared channel 104. Thus, the argument of knowledge provides a commitment of a provider thereof to be a recipient of the manicoded message, and the manicoded message provides an acknowledgment that the manicoded message has been provided to the recipient. From the point of view of the sending entity operating the manicoded message encoder 106, if the manicoded key 130 comes prior to the secret key knowledge, the sending entity may be considered to have obtained a commitment of the recipient 108 to receive any matching manicoded message that would follow.

Also, it may be observed that the manicoded message encoder 106, the manicoded key encoder 110, and the recipient 108 are illustrated as separate modules. In various implementations, as may be appreciated from the above description, it may occur that each module represents a distinct, individual entity. In other implementations, a single entity may provide both the encoders 106, 110. In still other implementations, a single entity may provide both the manicoded key encoder 110 and the recipient 108. Similarly, although the verifier 102 is illustrated separately, the verifier 102 itself may be implemented in combination with one or more of the encoders 106, 110 and/or the recipient 108. Various implementations and associated uses and functionalities thereof are provided below, or would be apparent.

For example, as described below, the system 100 of FIG. 1 may be utilized to execute entangled communications, in which two or more communications succeed or fail together. In other examples, identity information may be included, e.g., in the key manifest 132, so that, e.g., a commitment or acknowledgment made in conjunction therewith can be tied to a unique entity. In related embodiments, fading arguments may be implemented, which erode the type of identity information just referenced over time, so that that identity information is eventually lost and/or is no longer tied to the message in question (thereby supporting, for example, 'right-to-be-forgotten' scenarios). These and various other example usage scenarios are discussed in more detail, below.

In such scenarios described herein, all elements referenced as 'arguments' should be understood to be potentially included in one or both of the message manifest 126 and/or the key manifest 132. That is, in various examples, the manifests 126, 132 should be understood to represent or include information attached to, or included with, the manicoded message 124 and the manicoded key 130, respectively. Such information can include a number of arguments, e.g., arguments of knowledge, as entries on the manifests 126, 132. For example, as described herein, such arguments may include arguments related to identity, temporal information, related messages or keys, related channel(s), knowledge tokens (e.g., for establishing message knowledge and/or ownership), or types of security techniques being used. Consequently, in the following description, all such arguments should be understood to be potentially included in a corresponding one of the manifests 126, 132, even if not explicitly described as such in a given example.

Also in FIG. 1, the verifier 102 is illustrated as executing using at least one processor 102*a* and a non-transitory computer readable storage medium 102*b*. That is, FIG. 1 illustrates that the verifier 102 represents a special-purpose computer in which the at least one processor 102*a* executes instructions stored on the medium 102*b* to implement the various aspects of the verifier 102, including those not explicitly illustrated in the example of FIG. 1.

Of course, it will be appreciated that any of the encoders 106, 110 and the recipient 108 may be implemented using a processor and associated non-transitory computer readable storage medium. For purposes of clarity and conciseness, these are not explicitly illustrated in the simplified example of FIG. 1. Similarly, it will be appreciated that various hardware and software components, e.g., for network communications, human input/output, power consumption, and other standard computer-related features and functionalities, may be used to implement any of the various elements of the system 100 of FIG. 1, as would be apparent to one of skill in the art.

FIG. 2 is a flowchart illustrating example operations of the system of FIG. 1. In the example of FIG. 2, operations 202-206 are illustrated as separate, sequential operations. However, in various implementations, additional or alternative operations may be included, and/or one or more operations may be omitted. In the various implementations, two or more operations or sub-operations may be executed in a partially or completely overlapping or parallel manner, or in a nested, iterative, looped, or branched fashion.

In FIG. 2, a manicoded key is received from at least one shared communication channel, the manicoded key including a key manifest for a secret key, the key manifest providing an argument of knowledge for the secret key (202). For example, with respect to FIG. 1, the key manifest interpreter 136 may receive, by way of the channel monitor 134, notification of the manicoded key 130 on the shared channel 104. In some embodiments, the channel monitor 134 may actively monitor the shared channel 104 for the manicoded key 130. In other embodiments, the channel monitor 134 may passively receive the manicoded key 130, or a notification thereof. For example, an entity posting the manicoded key 130 to the shared channel 104, e.g., the manicoded key encoder 110, may send a message to the verifier 102 with the manicoded key 130, or notifying the verifier 102 to check the shared channel 104. Additional or alternative example operations of the channel monitor 134 are described below, or would be apparent to one of skill in the art.

As described herein, the manicoded key 130 represents an argument of knowledge of the secret key associated with the secret key knowledge 116, 118, 120. More particularly, the key manifest 132 includes an entry, referred to herein as "S" or "type S argument", which is calculated based on the secret key. Such a calculation explicitly allows for a verification process in which S is used, e.g., in conjunction with a public key corresponding to the secret key, to determine that any entity capable of constructing S also possesses (or otherwise has sufficient knowledge of) the secret key. Various techniques for constructing S are described herein. Thus, in implementation, it is assumed that the key manifest interpreter 136 knows, or has the ability to know, which such technique was used to construct S. Then, the key manifest interpreter 136 may be configured to utilize an appropriate, corresponding verification process (e.g., obtain the necessary public key) to verify, for example, that any entity capable of constructing S, and also possessing the manicoded message 124, has the ability to obtain message content of the manicoded message 124.

A manicoded message may be received from the at least one shared communication channel, the manicoded message including a message manifest for the secret key, the message manifest including an implication argument indicating that knowledge of the secret key enables access to message content of the manicoded message (204). For example, the message manifest interpreter 138 may receive, by way of the channel monitor 134, the manicoded message 124 and the message manifest 126. As described herein, the message manifest 126 may include an entry, referred to herein as "T", or "type T argument", which is an implication argument constructed to indicate that knowledge of the secret key implies an ability to decode the manicoded message 124 and obtain message content of the message 112. As with S, techniques for constructing T are provided herein.

As described herein, the message content of the message 112 may be identical to underlying source message content. In some examples, however, there may be some other relationship between the message content of the manicoded message 124 and underlying source message content. For example, the underlying source message content may have a further layer of security such that decoding the manicoded message 124 merely provides access to the message content that requires compliance with additional security measures to access the underlying source message content.

The key manifest and the message manifest may be compared to establish that an owner of the secret key and the manicoded message has access to the message content (206). For example, the manifest comparator 140 may receive interpreted results from the interpreters 136, 138, and may then compare these interpreted results to determine, e.g., a match indicating that access to the message content has been verified. It will be further appreciated that a manifest, or its entries, may be compared to, or matched with, more than one other manifest, or its entries, potentially resulting in more than one matching.

Of course, FIG. 2 represents a high-level view of example operations of the system 100 of FIG. 1, and should not be considered limiting of additional or alternative embodiments. For example, as referenced above, it may occur that S and T are placed on the shared channel 104 together or individually, and, in the latter case(s), either S or T may be placed on the shared channel before the other.

In other examples, additional entries besides S and T may be included in the manifests 126, 132. For example, one or both manifests 126, 132 may include a (possibly cryptographic) identity of an entity responsible for providing S and/or T. In other examples, one or both manifests 126, 132 may include information characterizing the message content (without revealing the actual message content beyond a specified type or degree), and/or information characterizing additional security measures taken to safeguard the message contents. As described below, the interpreters 136, 138 may be configured to interpret or otherwise process all such entries within the manifests 132, 126.

Thus, the manicoded message encoder 106 is enabled to send the message 112 in a verifiable way. Of course, motivations for such verifiable transmission may vary. For example, the manicoded message encoder 106 may have a need to demonstrate delivery of a promised message to the recipient 108 who paid for it, thereby greatly reducing risks of disputes. As described, though the manicoded message encoder 106 uses the secret key in the process of encoding, the secret key may generally be not visible to the manicoded message encoder 106, as represented by the secret key knowledge 116.

The decoder 114 may be associated with an inbox (not explicitly illustrated as such in FIG. 1) of the recipient 108, in which it wishes to receive messages in a verifiable way. As with the channel monitor 134, the decoder 114 may receive such messages in an active or passive way, as long as the verifier 102 has an ability to verify that receipt has occurred. Again, the motivations may vary. In one example, the recipient 108 may have a need to demonstrate that no messages got lost in transmission, thereby greatly reducing risks of disputes.

The verifier 102 is assumed generally to be implemented by an entity having an interest in the integrity of the communication system. Here again, the motivations may vary. For example, the verifier 102 may be implemented by the recipient 108 in conjunction with the decoder 114, in scenarios in which the recipient 108 desires to ensure that any message arriving in its inbox can be verified by anyone, thereby greatly reducing risks of disputes.

Figure 3:
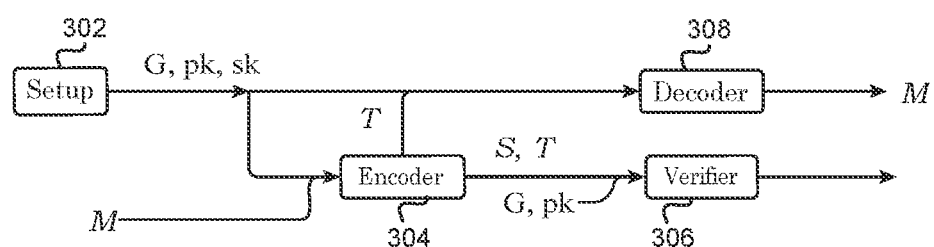
FIG. 3 is a schematic diagram illustrating a first example embodiment of the system of FIG. 1

FIG. 3 is a schematic diagram illustrating a first example embodiment of the system 100 of FIG. 1. In FIG. 3, it is assumed that communicating users set up a secret key sk (to serve as the secret key used in FIG. 1), and a public key pk, as represented by setup 302. The secret key sk and the public key pk need not necessarily be related. As referenced above, in a cryptographic embodiment of FIG. 3, a cryptographic argument S of knowing sk is utilized in the key manifest 132. A message-to-be-transferred, representing the message 112, may be encyphered to cyphertext at the encoder 304 by first encoding the message into an element M in a suitable set G (as described in more detail, below, with respect to FIG. 6, and where the term "set" includes various structures, possibly cryptographic, including the multiplicative group modulo n, elliptic- and hyperelliptic curves, and many others), and then constructing over G a cryptographic argument T. As described above, knowing sk implies knowing M. T thus represents ciphertext for the message manifest 126. The ciphertext is deciphered to the message content at the decoder 308 by first using knowledge of sk on T to recover M, and then decoding M back to obtain the message content. Verification of communication of M is obtained by verifying both arguments S and T at the verifier 306. As described herein, M in this context thus is related to the message content of the manicoded message 124, where this message content is related to, but may not be identical to, an underlying, source message content.

In FIG. 3, the setup 302 produces G, pk, sk. The encoder 304, representing both encoders 106, 110 of FIG. 1, produces arguments S and T given G, pk, sk, M. The decoder 114 recovers M given G, pk, sk, T. In the example implementation, the verifier 306 produces an acceptance bit b given G, pk, S, T In a specific example, bit 0 represents rejection and bit 1 represents acceptance of the associated argument.

Figure 4:
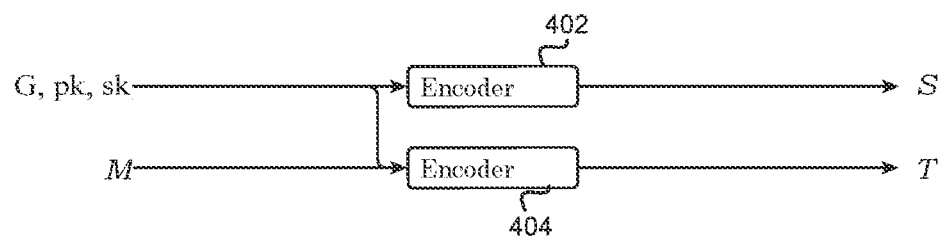
FIG. 4 is a schematic diagram illustrating a first example implementation of FIG. 3.

The setup 302 includes one component, which produces G, pk, sk with no explicit inputs, and in a secure, random (or pseudorandom, which should be understood to be covered by the term "random" throughout the present description) manner. As may be appreciated from the description of FIG. 1, FIG. 4 illustrates an implementation in which the encoder 304 includes two encoders, 402, 404, representing encoders 106, 110 of FIG. 1. As shown, the encoder 402 produces S given G, pk, sk but not M. Encoder 404 produces T given G, pk, sk, M. In some implementations, sk may be the secret key corresponding to the public key pk, but, as described herein, this correspondence is not required.

Figure 5:
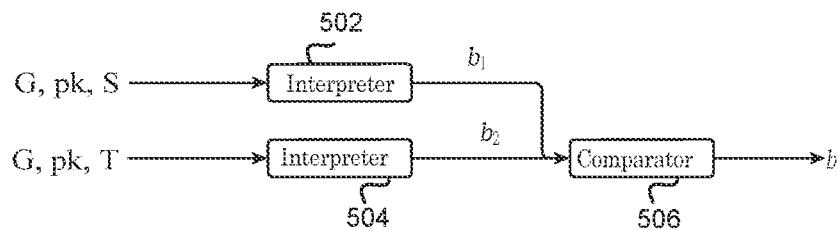
FIG. 5 is a schematic diagram illustrating a second example implementation of FIG. 3.
Figure 6:
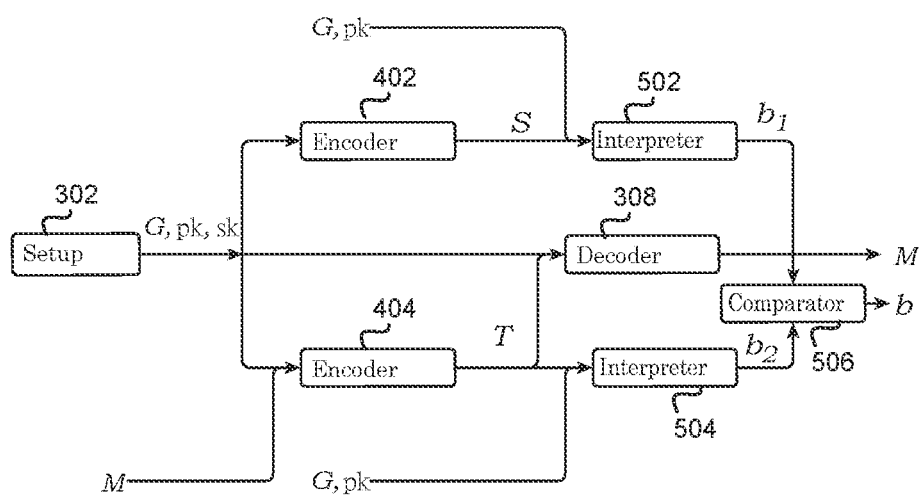
FIG. 6 is a schematic diagram illustrating a third example implementation of FIG. 3, incorporating the example implementations of FIGS. 4 and 5.

The verifier 306 of FIG. 3 may include, as shown in FIG. 5, two components, interpreters 502, 504, corresponding to the interpreters 136, 138 of FIG. 1. Interpreter 502 produces acceptance bit $b_1$ given G, pk, S but not T, sk, M, while interpreter 504 produces acceptance bit $b_2$ given G, pk, T but not S, sk, M The final acceptance bit b is produced by the comparator 506, corresponding to the manifest comparator 140 of FIG. 1. In FIGS. 5 and 6, the comparator 506 may operate as a logical-AND of its input acceptance bits, where, with brackets denoting dependence, the comparator 506 requires $b_1$[sk], $b_2$[sk,M] for the same sk and outputs b[M], since S[sk], T[sk,M].

Using the processes described herein ensures that M is communicated securely from one user to another, and that any user, including third-parties to the communication, can verify that communication of M has occurred. That is, it can be verified that a message solving a particular statement was communicated, where it is assumed that the statement is difficult to solve for M, even with the arguments S and T. For example, the well-known discrete logarithm problem may be utilized to set up a hard-to-solve statement of the form $y=g^M$ over G where y, g, G are known, but not M.

With S and T being constructed as described herein, using S and T enables verification that communicating users know the solution M to the statement. Thus, when argument S is produced one can verify communicating users know sk, and when argument T is produced one can verify communicating users know M solving the statement, and hence that M was communicated through T.

In example embodiments, the arguments S and T are produced only if they will successfully verify. As discussed below, encoders 402, 404 may be applied in any order, and, e.g., with sk initially unknown to the decoder 308. This ensures that M is communicated only if both S and T are, and hence the communication can be verified. Such embodiments thus provide a transactional (all-or-nothing) guarantee for verifiable communication.

The decoder 308 is executed by communicating users who are interested in receiving messages using this system. These users decode messages by applying the knowledge of G, pk, sk to T to recover M. The specifics of this process depend on the embodiment, and are thus described in more detail in the following descriptions of such embodiments.

Using the processes described herein ensures (for practical purposes, e.g., it is extremely likely) that communication of M has occurred if and only if verification has been accepted. In other words, in example implementations, the decoder 308 recovers M if and only if comparator 506 accepts. Thus, the combination of at least two arguments is used to constitute verifiable communication. If communicating users each make a separate argument of knowing M, then knowledge of M is verified for these users, but not communication. The systems of FIGS. 1-6 thus provide verification of communication as a single primitive.

In the following description of various embodiments for, e.g., constructing S and T, the setup 302 is carried out using standard techniques that depend on the embodiment being implemented. Each embodiment description includes specifics of this process.

In the embodiments described here, unless explicitly stated otherwise, a message-to-be-delivered is identified with its possibly padded (in a cryptographic or non-cryptographic sense) binary form and a corresponding number M If M is no greater than the cardinality of the set G of a given embodiment, then M is identified with the Mth element of G. Otherwise, standard techniques apply, including applying the system to each small enough part of the message, as well as using a hybrid cryptosystem where the present system is used for key encapsulation and a standard symmetric cryptosystem for data encapsulation. The same techniques apply if M is used in an exponent of a group generator and M is greater than the cardinality of the group.

In certain embodiments a well-known message is used. In this case, unless explicitly stated otherwise, the well-known message is identified with a number Q and the Qth element of G similarly. Other standard techniques apply for choosing the well-known message, including using a trusted party to choose it. For security of arguments, in particular of S, the well-known message is chosen in an unpredictable manner only after the setup part is complete, such as by applying a cryptographic hash function to data including pk. Unless stated otherwise, a random choice means a draw with uniform probability from a set that is understood from the context.

The description of each embodiment details explicit realizations of the various system elements for FIGS. 1-5, i.e., G, sk, pk, M, S, T. Taken together, S and T verify the communication of M Other elements specific to each embodiment may also appear. Labels given to embodiments are for convenience of reference only and should not be understood to limit them in any way.

Mathematical writing follows standard cryptography notation, except as noted. For example, Letters, possibly large-cap or with primes, denote variables, so that A, A', A", a, a', a" are distinct. Usually, small letters denote numbers or set elements and capital letters denote objects. pk and sk, possibly tuples, denote public and secret key respectively. Subscript denotes an index, which is part of a variable notation. Superscript denotes an exponent of a power. Curly braces denote a set description. Brackets denote indexing or dependencies, as will be understood from the context. Parentheses with commas denote a tuple or a function application, as will be understood from the context. Meanwhile, mod n denotes arithmetics modulo n. Otherwise symbols have standard mathematical interpretation.

In a first example embodiment for constructing S and/or T, the Schnorr protocol may be used in conjunction with the RSA cryptosystem. In the example, user A (e.g., the recipient 108 in FIG. 1, where, as described, the recipient may represent one or more recipients) may wish to receive a message from user B (e.g., the manicoded message encoder 106 of FIG. 1, where, again, one or more entities may be involved in sending the message in question). User A first constructs an RSA secret key (d, n), a corresponding public key (e, n), and a random generator g of a subgroup of the multiplicative group modulo n, for a suitable choice of e, d, n, g. One well-known example choice is n=pq, p=2p'+1, q=2q'+1 where p, q are primes and p', q' are sufficiently large distinct random primes, and g=$x^2$ mod n where x is a random number satisfying gcd(x±1, n)=1, where gcd is the greatest common divisor function. For such a choice, the multiplicative order o of the subgroup generated by g is known to be equal to p'q'. In this embodiment(s), the order o of the subgroup may be determined from (d, n).

Then, user A communicates (e, n, g) openly and communicates d securely (e.g. using a traditional cryptographic communication system) to user B. This establishes pk=(e, n, g) as a public key, sk=d as a secret key shared by both user A and user B, and the multiplicative group modulo n as the set G. In more detail, for RSA, sk also includes p, q as d can be inferred from them and pk. d could be inferred from other variables, such as p', q' if applicable. Including such variables in sk may be suppressed in various embodiments, and/or herein for the sake of the description. Then, User A produces an argument of knowing sk as a signature S of Q where S=G mod n. The argument is verified by checking that S'=Q mod n.

User B wishing to communicate message M to user A produces an argument T, whereby knowing sk implies knowing M as follows. Given a challenge c∈C[l], user B communicates (t, y, s) where t=$g^d$ mod n, y=$g^M$ mod n, s=d+cM mod o. In this context, a challenge C to a communicating user includes an element in a specified set, not chosen or feasibly predictable by this user, derived from possibly random data, and provided by a user or a third-party. This definition includes challenges computed as a cryptographic hash function applied to data. The set C[l] is often used for challenges, where C[l] is a large enough range of large integers that is designed to ensure a challenge chosen from it effectively introduces sufficient randomization into formulas where the challenge appears. C[l] may be set to the range of integers having a leading 1 bit followed by k bits, for some k>$log_2$(l), and (unless otherwise stated) l may be set to the group order o if the challenge provider knows o and otherwise to a number known to be significantly higher than o. Such a number can typically be determined. For example, for RSA, with public parameter n, l=n may be set. In some embodiments described below C is inverted modulo o, and for this inversion to be well-defined, C must be co-prime to o. The probability C is not co-prime to o is extremely small, comparable to the probability of factoring o or of breaking the RSA cryptosystem simply by guessing a secret parameter. The argument is verified by checking that $t^e=g$ mod n and $g^s=ty^c$ mod n. User A recovers M as $(s-d)/c$ mod o.

In a second example embodiment(s) for constructing S and/or T, a blind Schnorr/RSA technique may be used. This embodiment is a modification of the embodiment above, in which user A (e.g., the recipient 108) constructs e, d, n, g once, and may reuse them in the communication of multiple messages, while cryptographic security remains similar. This is done using a blinding-like technique (and may be used in other embodiments in which RSA is used to construct S), as described below.

In the example, user A sets up e, d, n, g similarly. In addition, user A randomly chooses j, $r \in C[l]$ and communicates (u, q, a, b) where $u=g^j$ mod n, $q=Q^j$ mod n, $a=g^r$ mod n, $b=Q^r$ mod n. Given a challenge $c' \in C[l]$, user A communicates z where $z=r+c'j$. This is an argument that the same exponent j appears in the forms of u and q. The argument is verified by checking that $g^z=au^{c'}$ mod n and $Q^z=bq^{c'}$ mod n.

User A communicates k, where $k=d+j$ mod o, securely to user B. This establishes pk=(e, n, g, u, q) as a public key and sk=k as a secret key shared by both user A and user B, and the multiplicative group modulo n as the set G. User A produces an argument of knowing sk as a signature S of Q where S=Q mod n. The argument is verified by checking that $S^e=Qq^e$ mod n. User B, wishing to communicate message M to user A, produces an argument T whereby knowing sk implies knowing M as follows. Given a challenge $c \in C[l]$, user B communicates (t, y, s) where $t=g^k$ mod n, $y=g^M$ mod n, $s=k+cM$ mod o. The argument is verified by checking that $t^e=gu^e$ mod n and $g^s=ty^c$ mod n. User A recovers M as $(s-k)/c$ mod o.

In a third example embodiment for constructing S and/or T, a delegated Schnorr/RSA technique may be used. In this embodiment, a modification of the first example embodiment (i.e., with the first Schnorr/RSA embodiment, above), but with user B producing S using user A's secret key, as if it is delegated. More generally, this technique also applies to other embodiments where user A and user B share sk.

In the example, User A sets up e, d, n, g similarly. User A communicates (e, n, g) openly and communicates d securely to user B similarly, establishing pk=(e, n, g), sk=d, and G similarly. User B produces an argument of knowing sk as a signature S of Q similarly. User B wishing to communicate message M to user A produces an argument T similarly. User A recovers M similarly.

In a fourth example embodiment for constructing S and/or T, a modification of the second example embodiment (using blind Schnorr/RSA) is implemented, in which user B is the one producing S using user A's secret key, as if it is delegated. This technique applies to other embodiments where user A and user B share sk. It demonstrates that techniques described here may be used together, although such combinations are not set forth here in a complete or exhaustive manner.

In the example, User A sets up e, d, n, g, j, k, u, q similarly. User A communicates (e, n, g, u, q) openly and communicates k securely to user B similarly, establishing pk=(e, n, g, u, q), sk=k, and G similarly. User B produces an argument of knowing sk as a signature S of Q similarly. User B wishing to communicate message M to user A produces an argument T similarly. User A recovers M similarly.

In a fifth example embodiment for constructing S and/or T, a modification of the third example embodiment (using delegated Schnorr/RSA) is implemented, in which user A constructs additional k secret parameters. This technique applies to other embodiments employing the discrete logarithm problem (variations of it may be applied to embodiments employing other hard problems). For RSA, from both a security and practical point of view, k would be much smaller than o.

By way of notation, in the following, formulas with a free subscript i apply for all $i \in \{1, \ldots, k\}$. In the example, user A sets up e, d, n, g similarly. In addition, user A randomly chooses $m_i \in C[l]$ and computes $y_i=g^{m_i}$ mod n. User A communicates (e, n, g, $y_i$) openly and communicates (d, $m_i$) securely to user B similarly, establishing pk=(e, n, g, $y_i$), sk=(d, $m_i$), and G similarly. User B produces an argument of knowing sk as follows. Given challenges $c_i \in C[l]$, user B communicates (t, $s_i$) where $t=g^d$ mod n, $s_i=d+c_im_i$ mod o. The argument is verified by checking that $t^e=g$ mod n and $g^{s_i}=ty_i^{c_i}$ mod n.

User B wishing to communicate message M to user A produces an argument T whereby knowing sk implies knowing M as follows. Given challenges $c, c_i' \in C[l]$, user B communicates (y, s) where $y=g^M$ mod n, $s=d+(\Sigma c_i'm_i)+cM$ mod o. The argument is verified by checking that $g^s=t(\Pi y_i^{c_i'})y^c$ mod n. User A recovers $m_i$ as $(s_i-d)/c_i$ mod o and M as $(s-d-\Sigma c_i'm_i)/c$ mod o.

In a sixth example embodiment for constructing S and/or T, a modification of the first example embodiment (with the first Schnorr/RSA embodiment) is implemented, where user A and user B produce the argument T together, without user B knowing the private key corresponding to pk, which remains secret rather than shared between them. In this context, for RSA, not only d remains secret but also variables that d can be inferred from with pk, such as p, q and if applicable also p', q', also remain secret. Also, the following technique should be understood to apply to other embodiments where a Schorr-like protocol is used for T. It demonstrates a case where sk is not a private key corresponding to the public key pk.

In the example, user A sets up two sets of RSA parameters e, d, n, g and e', d', n', g' similarly, ensuring that ao=n' for some positive integer (a large prime, for enhanced security) a. For example, one way is as follows. Choose p", q" such that n=pq, n'=p'q', p=2p'+1, q=2p'+1, p'=2p"+1, q'=2q"+1 and p, q, p', q' are primes and p", q" are sufficiently large distinct random primes, and choose g, g' such that $g=x^{2p'}$ mod n, $g'=x'^2$ mod n' where x, x' are random numbers satisfying gcd(x±1, n)=1, gcd(x'±1, n')=1. For these choices, o=q', a=p'. In a similar way, one may also obtain similar setups where, in comparison to the setup just described, where a is a product of two or more large prime numbers.

In the example, user A communicates both (e, n, g) and (e', n', g') openly, establishing pk=(e, n, g, e', n', g'), sk=(d, d'), and G similarly. User A produces an argument of knowing sk as a signature-pair S of Q using d, d' similarly.

User B wishing to communicate message M to user A produces an argument T whereby knowing sk implies knowing M as follows.

First, user B learns r where $r=g'^{d'}$ mod n' privately. One way to do it, by way of non-limiting example, is the following. User B randomly chooses $a' \in C[n']$ and communicates b' where $b'=g'a'^{e'}$ mod n'. User A communicates w' where $w'=b'^{d'}$ mod n'. User B verifies that $w'^{e'}=b'$ mod n' and learns r as w'/a' mod n'. Note that user B does not learn d', or d, and hence no part of sk.

Next, user A randomly chooses $j' \in C[l]$, computes k'=d'+j', and communicates (u', v') where $u'=g'^{k'}$ mod n', $v'=g'$ mod n'. Given a challenge $c \in C[l]$, user B communicates (t, y, s) where $t=g'^r$ mod n, $y=g^M$ mod n, s=r+cM mod n'. The argument is verified by checking that $g^{n'}=1 \bmod n$, $u^{e'}=g'v'^{e'} \bmod n'$, $t^{v'}=g^{u'} \bmod n$, $g^s=ty^c \bmod n$. User A recovers M as $(s-r)/c \bmod o$.

In a seventh example embodiment for constructing S and/or T, a modification of the third example embodiment (with the delegated Schnorr/RSA embodiment) is implemented, in which a Diffie-Helman like protocol is used for constructing T. In the example, user A sets up e, d, n, g similarly. User A communicates (e, n, g) openly and communicates d securely to user B similarly, establishing pk=(e, n, g) and sk=d.

User B produces an argument of knowing sk as a signature S of Q similarly. User B wishing to communicate message M to user A produces an argument T whereby knowing sk implies knowing M as follows. User B randomly chooses j∈C[l] and communicates (j, t) where $t=g^{dj} \bmod n$. Given a challenge c∈C[l], user B communicates (y, s) where $y=g^M \bmod n$, $s=dj+cM \bmod o$. The argument is verified by checking that $t^e=g^j \bmod n$, $g^s=ty^c \bmod n$. User A recovers M as $(s-dj)/c \bmod o$.

In an eighth example embodiment for constructing S and/or T, a modification of the seventh example embodiment, just preceding, is used in conjunction with the second example embodiment (i.e., the blind Schnorr/RSA embodiment).

In the example, user A sets up e, d, n, g similarly. In addition, user A randomly chooses j', r∈C[l] and communicates (u, q, a, b) where $u=g^{j'} \bmod n$, $q=Q^{j'} \bmod n$, $a=g^r \bmod n$, $b=Q^r \bmod n$. Given a challenge c'∈C[l], user A communicates z where $z=r+c'j'$. This is an argument that the same exponent j' appears in the forms of u and q. The argument is verified by checking that $g^z=au^{c'} \bmod n$ and $Q^z=bq^{c'} \bmod n$.

User A communicates (e, n, g, u, q) openly and k, where $k=dj' \bmod o$, securely to user B, establishing pk=(e, n, g, u, q) and sk=k. User B produces an argument of knowing sk as a signature S of Q where $S=Q^k \bmod n$. The argument is verified by checking that $S^e=q \bmod n$.

User B wishing to communicate message M to user A produces an argument T whereby knowing sk implies knowing M as follows. User B randomly chooses j∈C[l] and communicates (j, t) where $t=g^{kj} \bmod n$. Given a challenge c∈C[l], user B communicates (y, s) where $y=q^M \bmod n$, $s=kj+cM \bmod o$. The argument is verified by checking that $t^e=u^j \bmod n$, $g^s=ty^c \bmod n$. User A recovers M as $(s-kj)/c \bmod o$.

In a ninth example embodiment for constructing S and/or T, a modification of the third example embodiment (using delegated Schnorr/RSA) is implemented, in which a Cramer-Shoup like protocol is used to construct T.

In the example, user A sets up RSA parameters similarly but with two randomly chosen generators instead of one, yielding e, d, n, $g_1$, $g_2$. User A wishing to receive a message from user B first randomly chooses $j_1$, $j_2$, $k_1$, $k_2 \in C[l]$, then sets up a Cramer-Shoup key pair on G with z=d, with $g_1$, $g_2$ adopted from the RSA parameters, and with $x_i=j_id \bmod o$, $y_i=k_id \bmod o$ for i∈{1, 2}. Note that $x_1$, $x_2$, $y_1$, $y_2$ function as blinded-like version of the parameters $j_1$, $j_2$, $k_1$, $k_2$ (in other embodiments, other blinding-like techniques may be applied). This yields a public key (c', d', h) where $c'=g_1^{x_1} g_2^{x_2} \bmod n$, $d=g_1^{y_1} g_2^{y_2} \bmod n$, $h=g_1^z \bmod n$, a secret key ($x_1$, $x_2, y_1, y_2, z$), and a cryptographic hash function H.

User A communicates (e, n, $g_1, g_2$, c', d', h, $j_1, j_2, k_1, k_2$, H) openly and d securely to user B similarly, establishing pk=(e, n, $g_1, g_2$, c', d', h, $j_1, j_2, k_1, k_2$, H) and sk=d.

User B produces an argument of knowing sk as a signature S of Q similarly. User B wishing to communicate message M to user A produces an argument T as follows. User B randomly chooses j, k∈C[l] and computes $u_1=g_1^k \bmod n$, $u_2=g_2^k \bmod n$, $y=g_1^M \bmod n$, $e'=h^ky \bmod n$, $\alpha=H(u_1, u_2, e')$, $v=c'^k d'^{k\alpha} \bmod n$. Given a challenge c∈C[l] (c may be set to a function of $\alpha$), user B computes $s=dj+cM \bmod o$, and communicates (j, y, s, $u_1, u_2$, e', v). The argument is verified by recovering $\alpha$ as $H(u_1, u_2, e')$, setting t to $h^j$, and checking that $h^e=g_1 \bmod n$, $g_1^s=ty^c \bmod n$, $v^e=u_1^{j_1} u_2^{j_2} (u_1^{k_1} u_2^{k_2})^\alpha \bmod n$. User A recovers M as $(s-dj)/c \bmod o$.

In a tenth example embodiment for constructing S and/or T, a modification of the first example embodiment (using Schnorr/RSA) is implemented, in which a Lamport signature is used to construct S. Lamport signature may be used in the context of post-quantum cryptography. The Lamport signature can replace RSA in other embodiments described above, using similar techniques to those described below.

In the following, by way of notation, formulas with a free subscript i apply for all i∈{1, ..., k} and formulas with a free subscript j apply for all j∈{0, 1}. In the example, user A chooses positive integers k, l, with k≤l, as security parameters, 2k random numbers $r_{i,j}$ of length l bits each, a one-way function H from strings to l-bit strings, G as some group of order $o>2^l$, for which the discrete logarithm problem is difficult to solve (e.g., some choices G, such as the multiplicative group modulo n for some n, require that the group order o be hard to factor), a generator g of G, and a positive integer (a large prime, for security) a. User A computes $s_{i,j}=H(r_{i,j})$, $t_{i,j}=g^{n_{i,j}}$, q=ao. User A communicates ($s_{i,j}, t_{i,j}$, g, q, H, G) openly and ($r_{i,j}$) securely to user B, establishing pk=($s_{i,j}, t_{i,j}$, g, q, H, G) and sk=($r_{i,j}$).

User B produces an argument of knowing sk as a signature S of Q as follows. Given a challenge $c' \in C[2^l]$, let Q[i] be the ith bit of H(c', Q). User B computes $r_i=r_{i,Q[i]}$ and communicates $r_i$ as the argument S. The argument is verified by checking that $H(r_i)=s_{i,Q[i]}$.

All users compute $t_i=t_{i,Q[i]}$, $t'_i=t_{i,1-Q[i]}$, $t'=\Pi t'_i$. User B wishing to communicate message M to user A produces an argument T as follows. User B computes $r'_i=r_{i,1-Q[i]}$, $r'=\Sigma r'_i \bmod q$. Given a challenge c∈C[l], user B computes $y=g^M$, $s=r'+cM \bmod q$ and communicates (y, s). The argument is verified by checking that $gg^q=g$, $g^s=t'y^c$, $g^{r'}=t_i$. User A recovers r' as $\Sigma r'_{i,1-Q[i]} \bmod o$ and M as $(s-r')/c \bmod o$.

In an eleventh example embodiment for constructing S and/or T, a modification of the tenth example, just preceding, allows user A and user B to produce the argument T together, without user B fully learning sk, which remains secret.

User A sets up $r_{i,j}, s_{i,j}, t_{i,j}$, g, q, H, G similarly. User A communicates ($s_{i,j}, t_{i,j}$, g, q, H, G) openly, establishing it as pk, and leaves $r_{i,j}$ secret, establishing it as sk. User A produces an argument of knowing sk as a signature S of Q similarly. In addition, user A computes r' similarly and communicates it securely to user B, i.e. without revealing $r_{i,1-Q[i]}$ (which is part of sk) to user B. All users compute $t_i, t'_i, t'$ similarly. Now r' can be verified by checking that $g^{r'}=t'$. User B wishing to communicate message M to user A produces an argument T similarly (using r' only). User A recovers M similarly.

In a twelfth example embodiment(s) for constructing S and/or T, coupled arguments may be used. In this context, coupled arguments include arguments that depend on a common piece of knowledge. Such a piece need not be sk or M. In each of the first-eleventh embodiments described above, the arguments S and T were coupled. In the first example embodiment, for example, and in many other cases, a common piece is d, which happens to be sk.

For different examples, e.g., in the sixth and eleventh example embodiments, a common piece is r, r' respectively, not sk. Hence, these examples demonstrate that even without knowing sk, and knowing only, e.g., some other piece of knowledge, one can make an argument that knowing sk implies knowing M.

In general, coupling is one way to construct arguments S, T that match on some sk as described herein. Such coupling allows mixing-and-matching of various cryptographic methods, including known or future ones.

In a thirteenth embodiment, implicit arguments are used, which arise when the explicit verifiable communication of one or more arguments results in other arguments that were not communicated explicitly but can still be verified by anyone. For example, it may be assumed that all know that user A knows a satisfying $g^a=y$ over G and user B knows b' satisfying $g^{b'}=z$, both over G where g, y, z, G are given. Then, when user A verifiably communicates a, as defined by the first equation, to user B, anyone can verify that user B knows not only a but also b for $g^b=yz$, since the solution is b=a+b'.

The verifiable communication involves an explicit argument T that knowing some sk, e.g., the PKI private key of user B, implies knowing a, as discussed previously. However, in this case anyone can verify additional arguments. For example, one is T' that knowing b for the second equation implies knowing c for the third; another is S' that c for the third is known. Since no one can verify T', S' before T is communicated, T', S' are seen to be implicit in T.

More generally, an implicit argument is a verifiable one that was not explicitly communicated but can be verified only after some other argument was verifiably communicated. This can be formalized as follows. Here, by way of notation, formulas with a free subscript i apply for all $i \in \{1, \ldots, k\}$.

Assume k arguments are verifiably communicated. Let $R_i$ be the ith argument communicated, $E_i$ be the set $\{R_1, \ldots, R_i\}$ of explicit arguments, $V_i$ the set of arguments verifiable after $E_i$ is communicated, $V_i'$ the set $V_i \setminus V_{i-1}$ of arguments verifiable only after $E_i$ is communicated, where $V_0$ is the empty set by convention. The set $I_i$ of arguments implicit exclusively in $R_i$ is $V_i' \setminus E_i$. These definitions can be naturally generalized to account for concurrent communication of multiple arguments at a time.

In many cases implicit arguments may be ignored, because they may imply knowledge that is (at least essentially) random or irrelevant. In the example described above, a, b', b are all random, though it is enough for a or b' to be random for b, the implicitly implied knowledge, to be as well. In other cases, as described below, implicit arguments are not ignored.

As described above, in various embodiments, it may occur that the argument T is made only after argument S was made successfully. In such cases, argument S functions as a commitment of user A to receive verifiable communication of a message M from user B. In other words, once argument S is successfully made, user A can no longer deny receiving M when argument T is made by user B.

As also referenced, it may occur that argument S is made only after argument T is made successfully. Effectively, now argument T functions as a commitment of user B to send verifiable communication of a message M to user A. In other words, once argument T is successfully made, user B can no longer back out of verifiable communication of M, which occurs when argument S is made by user A.

Swapping the order of arguments can be applied to virtually any embodiment. The structure of the system 100 remains, and so does the resulting verifiable communication. The change only results in different guarantees to the communicating users due, for example, to the different commitments associated with the arguments. In turn, this leads to different advantages and disadvantages of the transformed embodiment for a particular purpose.

For example, the user making the second argument is in a position to avoid making it, thereby breaking the communication. If argument S is made before argument T, then this breaking does not result in message M being communicated, whether verifiably or not. This is often a desired result in case of breaking.

However, if argument T is made before argument S, then this breaking may result in message M being non-verifiably communicated, which is often an undesirable result. In particular, this result may happen when sk is a private key, e.g., the one corresponding to pk, already known to the decoder 114, so it can decode T without S.

One way to address this difficulty is ensuring that sk is a secret key unrelated to pk and that argument S establishes sk, rather than arguing a known one. More details of such a construction are described below, where a chain of arguments is used to construct S. Then, breaking may only result in establishing that M satisfies certain equations, possibly determining some of its properties but not determining M itself. In practice, this is often an acceptable and even desirable result.

As just referenced, embodiments where more than one argument like S or more than one argument like T is produced may be referred to as chaining arguments. For example, user B might make an argument $T_1$ whereby knowing sk implies knowing $sk_1$, and an argument $T_2$ whereby knowing $sk_i$ implies knowing M (e.g., for inclusion within the message manifest 126). Then, when argument S is made, one can verify knowledge of both sk and $sk_1$, and hence verify communication of M. $T_1$ and $T_2$ together can be viewed as a chain of two arguments that constitutes an argument T as described above with respect to FIGS. 1-6.

Further, user A might make an argument $T_1$ whereby knowing $sk_0$ implies knowing sk, and an argument $S_1$ whereby $sk_0$ is known, so one can verify that user A knows sk (e.g., for inclusion within the key manifest 132). Here too, $S_1$ and $T_1$ together can be viewed as a chain of two arguments that constitutes an argument S as described herein. Longer argument chains can be constructed with a similar effect. In some embodiments, different users may construct different parts of the argument chain. For example, in above embodiments in which user A and user B construct an argument S or T together, a potential view of the argument is as an argument chain, as discussed here.

In embodiments described above, protocols to construct arguments of knowledge utilize varying levels and types of interactivity, e.g., at least two communications by different users performed sequentially, and dependence of at least one communication on a previous communication(s). In the following examples, cryptographic arguments-of-knowledge machineries (AOKM) are used to convert such protocols to become non-interactive arguments of knowledge, while providing similar security guarantees.

Two such example machineries are signatures of knowledge (allowing arguments on NP-statements, that is nondeterministic-polynomial ones) and zk-SNARK (allowing arguments on NP-statements expressible as an arithmetic circuit, and/or as a program for a machine specification. Equations in embodiments herein can be expressed as arithmetic circuits, which fits any of the machineries). In pertinent part, both machineries perform the following function or variations thereof: given a statement of the form "knowing w makes it easy to verify that x satisfies related conditions," produce an argument of knowing w without revealing w. Performing such a function is what defines an AOKM herein. Such a w (possibly a tuple) is called a witness for input x (also possibly a tuple) that satisfies the conditions. Such a machinery allows one who knows such a witness w to make an argument of knowledge of w without revealing w.

Figure 7:
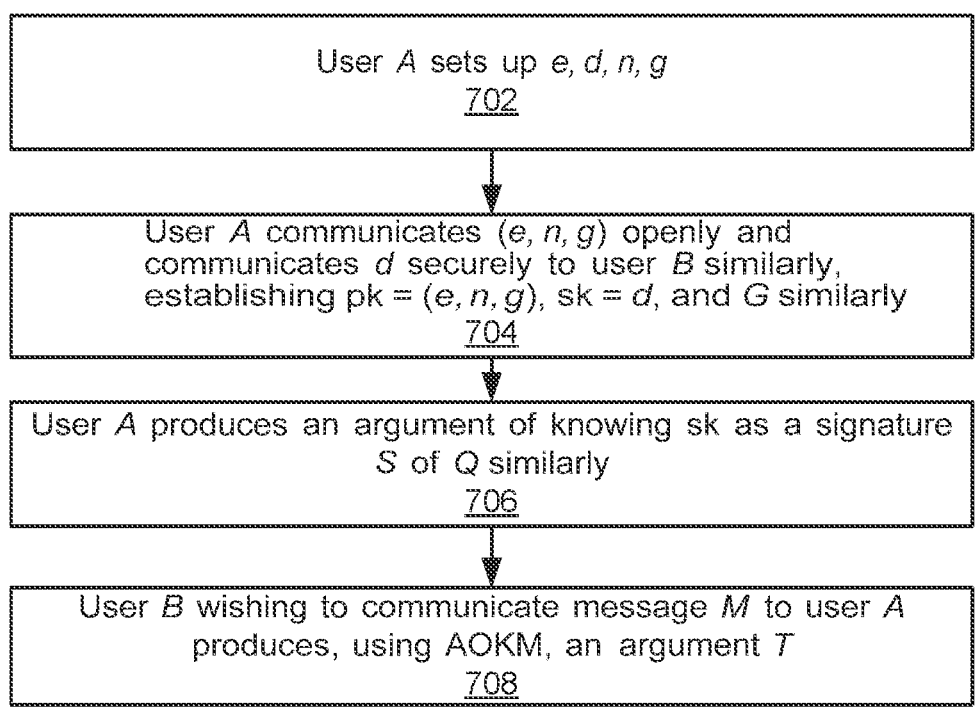
FIG. 7 is a flowchart illustrating transformation of an interactive technique for constructing an argument of knowledge into a non-interactive technique.

To demonstrate interactivity removal, the following description, as illustrated in FIG. 7, provides an example of a conversion of the Schnorr protocol, used in embodiments above (such as in the first example embodiment for constructing S and/or T), to a certain kind of signature of knowledge, using AOKM. In the example, it is assumed that a signature of knowledge ties a message-to-sign m, different than the message-to-be-delivered M (e.g., the message 112 of FIG. 1) to some knowledge. For purposes of this example, m is arbitrary and publicly known; for example, it could be the empty message.

As referenced above, the Schnoor protocol defines its arithmetic operations over a group G with generator g, not necessarily mod n, and works in three steps. For purposes of the example, it is assumed that user B is making to user A the argument of knowledge of M such that $y=g^M$ for some known y. User B chooses a secret r and communicates t where $t=g^r$. User A produces a challenge c and communicates it. User B then communicates s where $s=r+cM$. User A verifies the argument by checking that $g^s=ty^c$.

An example conversion of the protocol may thus proceed as follows. During the setup part, a cryptographic hash function H is made public; its purpose is to remove interactivity. Given a message-to-sign m, user B chooses a secret r and communicates (c, s) such that $c=H(m, y, g, g^r)$, $s=r-cM$. The argument is verified by checking that $H(m, y, g, g^s y^c)=c$.

Each of the embodiments described above, as well as embodiments using combinations of techniques described above, can be transformed using AOKM. Three examples of such transformations are considered, depending on whether only the argument S is transformed, or only the argument T, or both. As an example, FIG. 7 considers transformation from interactivity to non-interactivity using AOKM with respect to the first example embodiment for constructing S and/or T, using the Schnorr protocol. If S only is transformed, the result is an embodiment where AOKM is used to construct S while the Schnorr protocol is still used to construct T. Alternatively, if only T is transformed, the result is an embodiment where RSA is used to construct S and AOKM is used to construct T. Finally, AOKM may be used to transform both S and T.

FIG. 7, is an example of the transformation of T, but not S. In FIG. 7, user A sets up e, d, n, g similarly (702). User A communicates (e, n, g) openly and communicates d securely to user B similarly, establishing pk=(e, n, g), sk=d, and G similarly (704). User A produces an argument of knowing sk as a signature S of Q similarly (706). User B wishing to communicate message M to user A produces, using AOKM, an argument T (708). Effectively, user B communicates that a witness d is known such that input (e, n, g, c, s, y, m) satisfies $g^d=g^s y^c$ mod n, $t^e=g$ mod n, $H(m, y, g, g^d)=c$, $M=(d-s)/c$ mod o, $y=g^M$ mod n. The witness w is sk, in this case d. The input x includes pk and non-interactive communication, in this case (e, n, g, c, s, y, m).

The preceding examples discuss constructing S and/or T by converting interactive into non-interactive constructions of S and/or T. Additionally, or alternatively, AOKM can be used to construct S, T directly, without transforming one of the embodiments described above. For the argument S, AOKM may be used to provide an argument S that effectively states that "a known witness $w_1$ makes it easy to verify that some input $x_1$ satisfies some difficult NP-statement $P_1$", meaning, e.g., that it is computationally infeasible to find a witness (to satisfying the statement) given only the input. There are many known difficult NP-statements, and many more may be devised.

For the argument T, AOKM may be used to produce an argument T that effectively states "a known witness $w_2$ makes it easy to verify that some input $x_2$ satisfies some other difficult NP-statement $P_2$, when given that $w_1$ is a witness of $x_1$ satisfying $P_1$."

For the purposes of the present description, $w_i$ includes sk but not M, $w_2$ includes sk, M and $x_1$, $x_2$ together include pk. Thus, a user that S indicates knows sk also knows M, because of implications of T.

In example embodiments described above that do not involve AOKM, the arguments only stated that M was communicated, and that it solves a difficult equation, e.g., $y=g^{x^J}$ for the discrete logarithm problem. Using AOKM, complex arguments can be made that M satisfies a wide range of properties of interest. Such complex arguments may be included, e.g., in the message manifest 126, in order to provide various message properties (e.g., message content properties) without revealing the message content itself, and may be referred to herein as "property argument(s)," or similar.

For example, in scenarios in which the message content includes an image file, such complex arguments (e.g., property arguments) may include a statement that M has a specific structure, such as a JPEG formatted image, or specific statistics, such as a specified color histogram, or even specific algorithm results, such as detection of two faces using a specified face detection algorithm.

Figure 8:
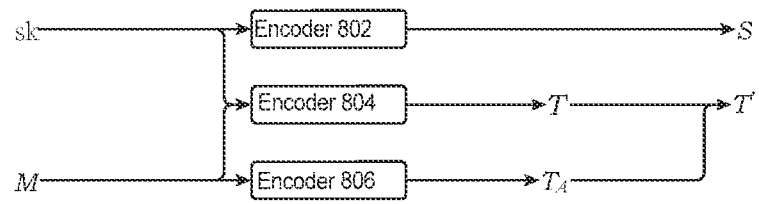
FIG. 8 is a block diagram illustrating an example implementation of the manicoded message encoder of FIG. 1, using the techniques of FIG. 7.
Figure 9:
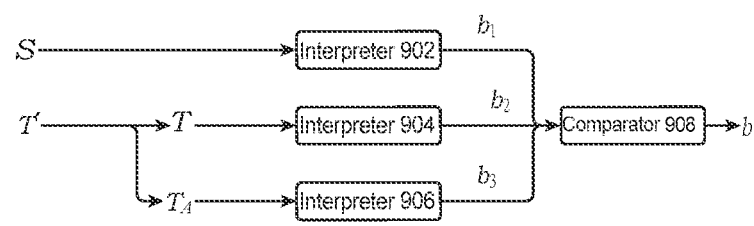
FIG. 9 is a block diagram illustrating an example implementation of the verifier of FIG. 1, using the techniques of FIGS. 7 and 8.

FIGS. 8 and 9 are block diagrams illustrating example implementations of the manicoded message encoder 106 and the verifier 102 of FIG. 1, using the types of AOKM-based, complex arguments just referenced. As may be observed with respect to FIGS. 3-6, the argument T is replaced with T' where $T'=(T, T_A)$. Thus, two arguments are included in the type T argument. One is an implication argument T, which conveys that knowing sk implies knowing M as described herein. The other is a new argument $T_A$, which is a property argument, indexed by a machine A (e.g., where the machine A may be implemented within the message manifest generator 122, but is not explicitly illustrated therein in the example of FIG. 1). The machine A can be any machine expressible using the AOKM being employed. In this regard, it may be appreciated that AOKM arguments may be convenient but not necessary to capture a property. For example, A may be expressed as a set of equations rather than a machine, as may be observed, for example, with respect to the ninth example embodiment for constructing S and/or T, above.

In the example of FIG. 8, encoder 802 produces S, and encoder 804 produces T. Encoder 806 produces T by running A with witness M as part of an AOKM process, as described above. Thus, $T_A$ is an argument on the correctness of applying a machine A with witness M; it is therefore, like T, implicitly dependent on M, which remains unknown to a verifier. By way of notations, with brackets denoting dependence, T [sk, M], $T_A$[M] is required to match on M the same way S[sk], T [sk, M] are required to match on sk. AOKM can be used to make one argument that is equivalent to these two, e.g., "a witness (sk, M) is known such that knowing sk implies knowing M, and machine A accepts M".

The machine A may also accept an input, such as configuration parameters. For example, such configuration parameters may include parameters for detecting two faces in a given face detection algorithm A, or a description of a machine and its input (e.g., some AOKM support a universal machine that, when given as input a description of a machine and its input, runs the machine on its input).

In FIG. 9, interpreters 902 and 904 interpret S and T as described above, respectively, e.g., with respect to FIGS. 5 and 6. Meanwhile, interpreter 906 (which, like the interpreter 904, may be considered to be included in the message manifest interpreter 138 of FIG. 1) accepts the same message manifest 126 and verifies $T_A$ included therein, using a verification key or other public parameter(s) used in AOKM processes, which, in the example of FIG. 9 may be viewed as part of pk.

In embodiments described above, there is only one message-to-be-delivered that is explicitly discussed. In some examples, communication protocols allow verifying communication of that message with a transaction guarantee; i.e., the verifiable communication either succeeds completely or fails completely.

When considering multiple messages, clearly each message can be verifiably communicated separately, in which case each communication provides a separate transaction guarantee. In other words, it is possible that only some messages would result in successful verifiable communication, for example due to one or more, possibly dishonest, users stopping cooperation with the communication protocol after only some messages were verifiably communicated.

In the following, verifiable communication is extended to support the delivery of multiple messages, even if each is between different origin and target users, in one unified transaction that either succeeds completely or fails completely. We call this mode of operation entangled communication, but this mode could also be referred to by any other appropriate nomenclature, e.g., atomic communications.

In the following, by way of notation, a free subscript i refers to all i∈{1, . . . , k}. In the example(s), messages $M_i$ are to be verifiably communicated, where $M_i$ is to be delivered from user $B_i$ to user $A_i$. Also, as elsewhere in this description, arguments T and/or S should be understood to be included, where appropriate in the message manifest 126 and/or the key manifest 132.

In a general non-entangled embodiment, with a set G common to all arguments to be made, and users $A_i$ or $B_i$ not necessarily distinct, then the setup results in G, $pk_i$, $sk_i$, the encoding results in user $A_i$ producing argument $S_i$, user $B_i$ producing argument $T_i$, and the decoding results in user $A_i$ recovering $M_i$ if and only if the verifying results in acceptance. Of course, many variations are possible; e.g., user $B_i$ might serve as the producer in the preceding example, instead of the user $A_i$.

The above example may be transformed into an entangled embodiment where all messages are verifiably communicated together. For example, another user C, perhaps not distinct, serving as a transaction coordinator, sets up its own public and secret keys $pk_C$, $sk_C$. User $A_i$ joins the transaction by making argument $S_i$ to user C secretly, a commitment (as described above) to receive a message from user C.

User C communicates argument $T_C$ over G whereby knowing $sk_C$ implies user $A_i$ knows $sk_i$ (e.g., knowing the PKI private key of user $A_i$ implies knowing the message), a commitment to send $sk_i$. This exploits the fact that ski can be delivered as a message, for example using an equation. For RSA, e.g, the equation $t^e=g$ mod n given t can be used to make an argument of knowledge of a secret key sk=d such that $t=g^d$ mod n.

Each user $B_i$ communicates $T_i$, a commitment to send $M_i$ upon communication of $S_i$; that is, upon communication of an argument of knowledge of $sk_i$. User C communicates $S_C$. Because of the cascading of arguments implications, triggered by the last communication of $S_C$, each $S_i$ is communicated and hence an argument that $A_i$ knows $sk_i$ is made; consequently, each $M_i$ becomes known to each $A_i$ at once. Moreover, all communications are verifiable at once. This completes the transaction. If the unified transaction protocol is stopped at any point before the last argument $S_C$ is communicated then the transaction fails completely, as intended.

It is possible to arrange the above protocol to minimize required communication. For example, a directed graph may be formed, with each node corresponding to a user and each edge corresponding to message-to-be-delivered from the origin's user to the target's user. Whenever a set of edges can be covered by a path originating from a single node, that set of edges can be made to trigger at once without any setup by the transaction coordinator. For that, the message-to-be-delivered associated with an edge is augmented (as described above) with the secret keys associated with all the edges that can be immediately reached from it. One may think of the transaction coordination described above as adding edges to ensure all the given edges are covered by paths originating from the node corresponding to the transaction coordinator.

Figure 10:
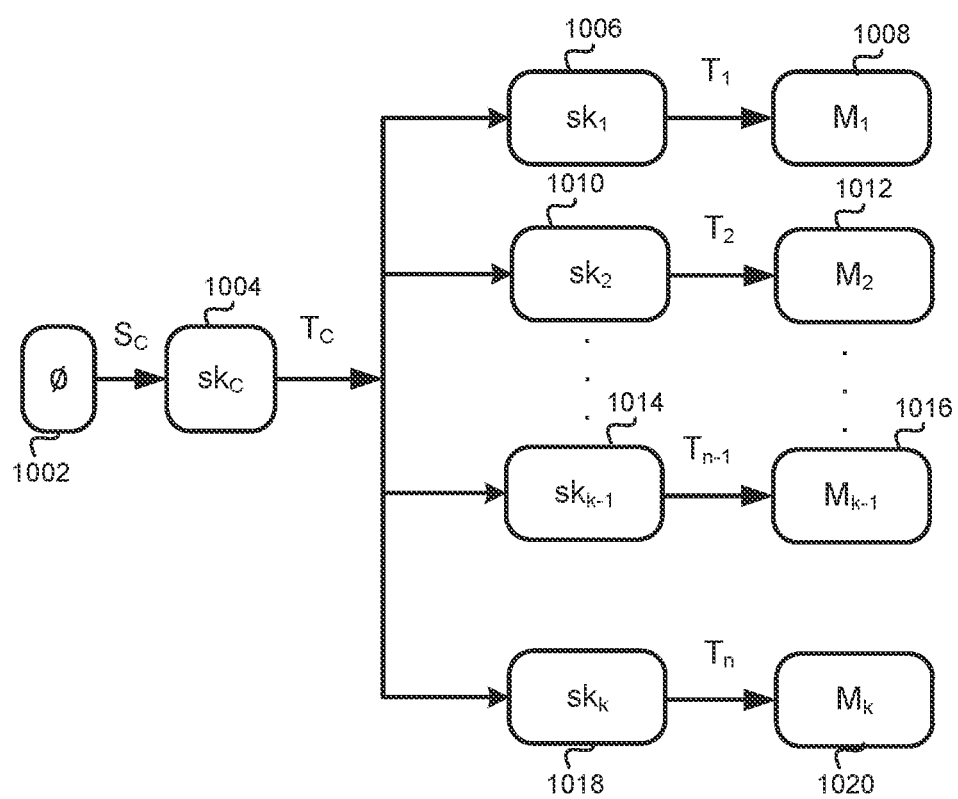
FIG. 10 is a block diagram of a knowledge diagram representing entangled communications in the system of FIG. 1.
Figure 11:
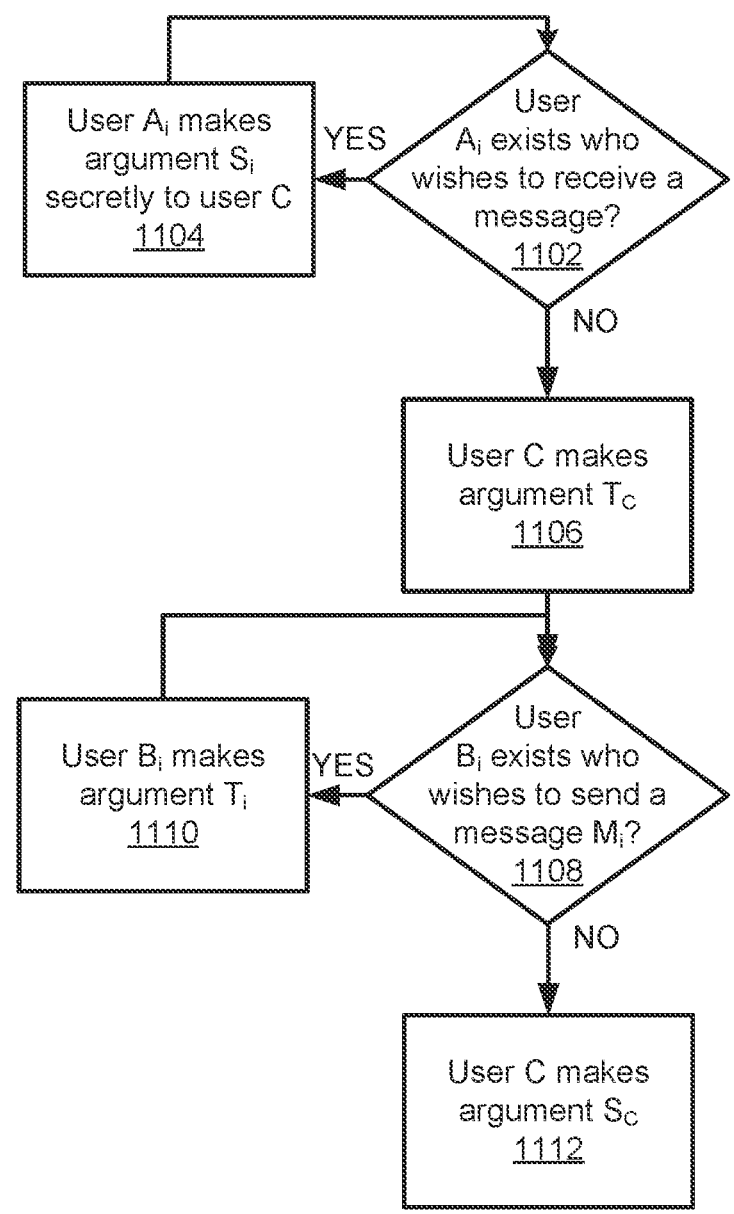
FIG. 11 is a flowchart corresponding to the example of FIG. 10.

FIG. 10 is a block diagram of a knowledge diagram representing entangled communications by way of example. FIG. 11 is a flowchart corresponding to the example of FIG. 10. As should be apparent from the above, $S_i$ is an argument of knowledge of $sk_i$. $T_C$ is an argument that knowing $sk_C$ implies knowing all $S_i$. $T_i$ is an argument that knowing $sk_i$ implies knowing message $M_i$.

Thus, in FIG. 10, each node 1002-1020 corresponds to and is labeled by a knowledge, which is a secret key or a message in this case, and each edge corresponds to a knowledge implication and is labeled by an argument. The symbol Ø represents no-knowledge and is discussed in more detail and context in the discussion about deduced arguments, below. It is used as the source of an edge labeled by a type S argument, where the target of the edge corresponds to knowledge that is argued directly, rather than as an implication of another knowledge.

In the example of FIG. 11, if a user A exists who wishes to receive a message in the present transaction (1102), then user $A_i$ makes argument $S_i$ secretly to user C (1104). This continues until all users $A_i$ make corresponding arguments $S_i$, and then user C makes argument $T_C$ (1106).

If a user $B_i$ exists who wishes to send a message $M_i$ in the same entangled transaction (1108), then the user $B_i$ makes argument $T_i$ (1110). Otherwise, user C makes argument $S_C$ (1112).

In FIG. 11, even without $T_C$, user $A_i$ learns $M_i$, though the basic requirement of an entangled communication transaction, that a verifier (e.g., the verifier 102) cannot verify communication of any $M_i$ until $T_C$ is made, holds. In other example implementations, a technique may be used for sending an unknown message (described herein with respect to the discussion of knowledge tokens), e.g. such that $sk_i$ is initially unknown, and only when $T_C$ is made do $sk_i$ become verifiably communicated to $A_i$ (and the entangled communication is verifiable in its entirety).

Also, as noted above, the operations of FIG. 11 can be done in a different order, or in parallel. The freedom is only limited by dependencies explicitly defined herein. For example, in the example embodiments, $T_C$ cannot be made before all $S_i$ are made, though the transaction could be said to close (for joining more $A_i$ users) when $T_C$ is made. In other example embodiments, a $B_i$ may be required for each $A_i$, or else each unpaired $A_i$ or $B_i$ is effectively not part of the entangled transaction.

In the above and other example implementations, verifiable communication transactions can be nested. In other words, a nesting transaction may be triggered by communicating an argument that implies other arguments, where each in turn triggers another nested transaction. Transactions also may be nested recursively. Each of the transactions involved, whether nested or not, would be associated with its own transaction coordinator. Therefore, it is possible to arrange highly entangled communications with decentralized orchestration.

In various embodiments described above, different types of individual or plain arguments are described. In the following, arguments on arguments, also called higher-order arguments, are considered. Since a plain argument, in non-interactive form, is also just data, one can make an argument of knowledge of another argument of knowledge.

Thus, by way of notation, A[M] is used to denote an argument of knowledge of some data M with some characteristics that are associated with A, without revealing M. For example, for a message M, A[M] is an argument of knowledge of M with some characteristics, and A'[A[M]] is an argument of knowledge of A[M] with other characteristics.

Note that knowledge of A[M] does not imply knowledge of M. Put another way, A[M] would be evidence M is a valid message by some criteria, and A'[A[M]] would be evidence A[M] is valid evidence by some other criteria. So the output of the former is fed to the latter one. A[M] is called a first order argument, and A'[A[M]] is called a second order argument. One can obtain arguments of order as high as desired.

Then, in a more specific example, the notation S[M] means that a type S argument is made, which is just an argument of knowledge of M, and the notation T[sk, M] means that a type T argument is made, where knowledge of sk implies knowledge of M. The notation S[S[M]] is a second order argument of knowledge of M, the notation (T[$sk_1$, $sk_2$], T[$sk_2$, M]) is a chain of two type T arguments, the notation T[$sk_1$, T[$sk_2$, M]] is an argument that knowing $sk_1$ implies knowing a type T argument, and the notation T[S[sk], S[M]] is an argument that knowledge of one type S argument implies the knowledge of another.

Notation other than S, T may be used to denote other characteristics, with a corresponding interpretation described in context. For example, J[M] may be said to be an argument that M is a JPEG formatted image. Juxtaposition can b e use d to denote a multi-argument; for example, the notation SJ[M]=(S[M], J[M]) is a multi-argument that M is known and is a JPEG formatted image, and the notation ST[sk, M]=(S[sk], T[sk, M]) is a verifiable communication of M.

Higher-order arguments in conjunction with fixed (or slowly growing in its input) size (such as zk-SNARK, described above) can be used to compress other arguments. An example method for this, given a set of arguments $R_i$, is to make an argument V[$R_i$] that all $R_i$ pass verification. Since V[$R_i$] is also simply an argument, compressed arguments of this type can be nested as many levels as desired.

In addition to the types of higher-order arguments just described, an inverted argument may be used that is a special kind of implicit argument. As described above, an implicit argument generally refers to a verifiable argument that was not explicitly communicated but that can be verified only after some other argument was verifiably communicated. Then, using the notation described above for implicit arguments, given an argument $T_0$=T [$sk_0$, M], its inverted argument is $T_0^{-1}$=T[M, $sk_0$], which, as an implicit argument, may have the status of passing or failing verification at any point.

An argument and its corresponding inverted argument each have an independent status, that is, each will be independently passing or failing verification. In a case where both pass verification, e.g., $T_0$=T[$sk_0$,M] and $T_0^{-1}$=T[M, $sk_0$] pass verification, the former means that M can be feasibly computed given $sk_0$, and the latter that $sk_0$ can be feasibly computed given M. In other words, not only is there a one-to-one map between the possible secret keys and the possible messages, but also this map is feasibly computable in both directions.

In example scenarios, an inverted argument can first pass verification and later fail verification. Suppose a random r is given, and that S[$sk_1$] and $T_0$ are made. Suppose further that, even without an argument, knowing $sk_1$ and r implies knowing $sk_0$; for the discrete logarithm problem as an example, this is true when $sk_0$ is defined as $sk_1$+r, which can be verified by any user by checking that $g^{sk_1}g^r = g^{sk_0}$. In this case, $sk_0$ is secret when $sk_1$ is secret. Suppose $sk_i$, for i>0, is the key of identity i, which all users know is secret. Then any user can infer that identity i is the only one who knows $sk_1$ and in turn also $sk_0$ and $T_0$. The purpose of r is thus to allow $sk_0$ to be verified as a secret unique (as described above) to the owner of identity 1, without revealing its key (e.g., no more likely than breaking its PKI) unless desired to do so with a partner. Hence, $T_1^{-1}$=T[M, $sk_1$] can pass verification (arguments $T_0^{-1}$=T[M, $sk_0$] and T[$sk_1$, $sk_0$] too can pass verification). In the event that S[$sk_2$] and T[$sk_2$, $sk_0$] are made, any user can verify that both identity 1 and identity 2 know $sk_0$ and so $T_1^{-1}$=T[M, $sk_1$] can fail verification.

In various example embodiments, implicit arguments (referenced above) can be systematically deduced. This leads not only to arguments of knowledge but also to arguments of no-knowledge, also referred to as arguments of ignorance. An example technique to obtain an argument of ignorance is as follows. Given a consensus on a random number r, for example a Blockchain block hash as described below, a group G for which the discrete logarithm problem is hard, and random generators $g_1$, $g_2$ of G, then with extremely high probability all parties are ignorant of x that satisfies $g_1^x = g_2^r$. As also referenced above, techniques are described for making an argument of knowledge unique to one entity, thereby implying that all other parties are ignorant of this knowledge.

The well-known De Morgan's laws can be used to obtain implicit arguments, including arguments of ignorance. Here, the notation referenced above is used, as well as ¬ to denote negation of knowledge (i.e., ignorance), ∧ to denote logical conjunction, and ∨ to denote logical disjunction.

With these notations, use of the laws may be demonstrated. The argument T[sk, M] is equivalent to T[¬M, ¬sk]. Making two arguments $R_1$, $R_2$ is like making the argument $R_1 \wedge R_2$, or equivalently ¬(¬$R_1 \vee$ ¬$R_2$). Note that claiming equivalence, not just likeness, means that the arguments $R_1$, $R_2$ would need to exhibit similar properties as $R_1 \wedge R_2$ do, such as, for example, bits of security or cryptographic method.

Thus, the argument ¬$R_1 \wedge$ ¬$R_2$ is equivalent to the argument ¬($R_1 \vee R_2$). Making the argument $R_1 \vee R_2$ directly is harder yet known to be doable. For example, techniques described herein may describe particular types of arguments (e.g., logical-AND and logical-OR); however, more general arguments may be deduced, e.g., using the negation rules described below. Also, generally speaking, logical functions on given arguments can be composed.

With deduced arguments, a type S argument may be viewed as a specific kind of type T argument. For example, the argument S[sk] is equivalent to the argument T[Ø, sk], where Ø represents knowledge of nothing, or equivalently no knowledge or tautological knowledge. De Morgan's laws can then be applied to T[Ø, sk].

Further, deduction of arguments is not limited to De Morgan's laws. Any deduction system may be used, such as, e.g., Propositional calculus, First-order logic, and many others. In example implementations, all verifiers with access to a given channel, such as the shared channel 104, may use the same deduction system for arguments on that channel, so they agree on the implicit arguments that are verifiably communicated on that channel.

The case where both a type T argument and the negation of its corresponding inverted argument are verifiable is described herein. Specifically, suppose $T_0 = T[sk, M]$ and $\neg T_0^{-1} = \neg T[M, sk] = T[\neg sk, \neg M]$ are both verifiable. The former means that M can be feasibly computed given sk, and the latter that without sk it is infeasible to do so. This corresponds nicely to the definition of a one-way function, a well-known concept. A Trapdoor one-way function, also a well-known concept, with trapdoor d is captured by adding the argument T[(d, M), sk], that knowing d one can feasibly compute sk from M.

In one example use of an argument of ignorance, the argument T [M, sk], is assumed to say that knowing M implies knowing sk. Using De Morgan's laws, the equivalent argument of ignorance is $T[\neg sk, \neg M]$, which says that ignorance of sk implies ignorance of M. When sk is a PKI private key, the argument says that one must have broken the PKI private key to have learned M. Hence, M may be considered to have the same level of security as the PKI private key.

In the below examples, it is assumed that knowledge is unique to a single party. Such an argument is called a source argument, as it can be viewed as designating the party as the source of the knowledge.

Then, in the thirteenth example embodiment, it is assumed that all know that user A knows a satisfying $g^a = y$ and user B knows b' satisfying $g^{b'} = z$, both over G where g, y, z, G are given. As discussed above, when user A verifiably communicates a to user B, anyone can verify user B knows b for $g^b = yz$. If a or b' are random, which is the case when one of them is a PKI private key, for example, then b in the third equation is also random and (with extremely high probability when the discrete logarithm problem is hard for G) uniquely known to user B. User B may thus be considered to be the source of b and the communicated argument is a source argument.

In examples above, where the argument T[M, sk] is made and sk is a PKI private key, then, to the extent that the PKI private key is not compromised, M cannot be known to anyone but the party owning sk. We therefore say that the party is the source of M, and T[M, sk] is a source argument. If the argument T[M', M] is also made, the same party may thus be determined to be also the source of M'.

In these examples, source arguments are explicit but the unique-knowledge inference drawn from them is implicit. In particular, it is possible for this implicit inference to fail verification later on. In the example just discussed, that could happen when the arguments $T[sk_1, M]$, $T[sk_2, M]$ are made, whence sk becomes shared and one can verify that sk, M are known to the parties owning $sk_1$, $sk_2$.

In embodiments described above, verifiable communication involved arguments only on characteristics of data. In the following, verifiable communication is extended to enable temporal arguments, i.e., arguments involving time, such as arguments stating that a message $M_1$ was communicated to user $A_1$ before message $M_2$ was to user $A_2$. One advantage of temporal arguments is that a party observing (e.g. a recording of) the arguments made on the channel in no particular order, could still extract the temporal information from them.

The availability of a cryptographic timestamp service is assumed. For example, the Blockchain service of BitCoin is one such service, but many well-known cryptographic timestamping methods are available and could be used.

Figure 12:
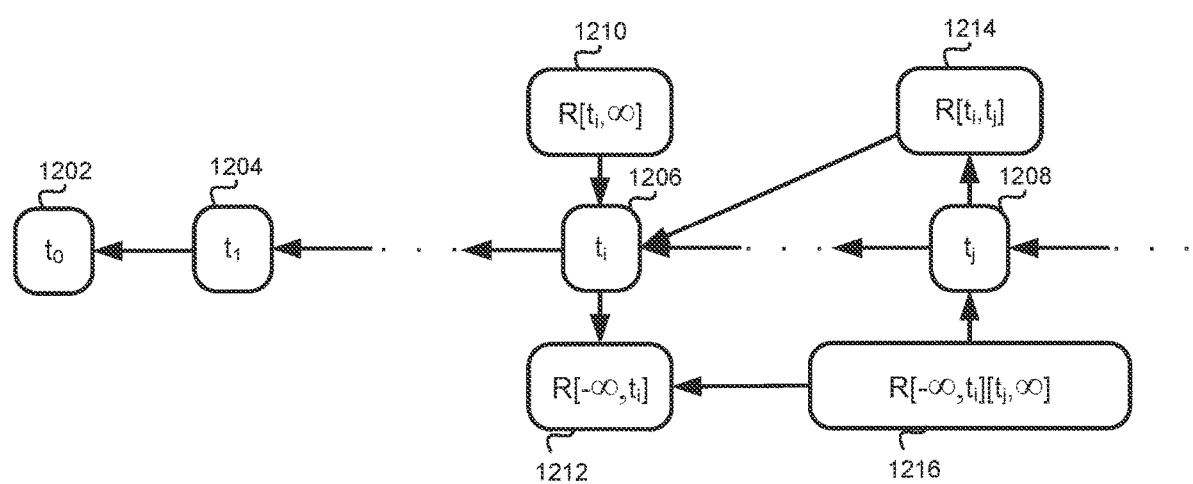
FIG. 12 is a block diagram of a dependency diagram illustrating the use of temporal arguments in the system of FIG. 1.

Temporal arguments and their relationships can be captured in a dependency diagram, as shown in FIG. 12 by way of example. Each node 1202-1216 corresponds to a timestamp or a temporal argument. In this context, both a timestamp and a temporal argument as arguments about time may be made, as the former can be described as an argument purely on order-in-time, and each edge corresponds to a dependency of its source on its target. A dependency conveys order-in-time; it is infeasible for the source to have happened at the same time or before the target, and a cycle of dependencies is infeasible, as it would contradict any possible ordering-in-time of the arguments.

In the example Blockchain service of Bitcoin, the timestamp service makes available a chain of blocks, referred to as a blockchain. Each block is identified with a cryptographic hash of its content. Except for the first block, also called the genesis block, each contains a reference to the previous block in the chain. The reference is the cryptographic hash of the content of the previous block. There may be many chains that can be traced back to the genesis block. However, the decentralized system producing this chain of blocks is designed so that the longest chain prevails and becomes the consensus of all system participants; shorter chains are ignored.

In addition, each block has a cryptographic proof-of-work embedded in it, and therefore the longer the chain, the more work has been proven for it. Since the effort put into a proof-of-work is measured in computational resources, one would have to possess at least 50% of the computational resources in order to monopolize what blocks get added to the blockchain. In practice, this rarely happens, and even when it does there is no feasible way for the monopolizer to produce blocks with hashes of its choosing, only to revise at some rate at least part of the longest chain as long as the monopoly is maintained.

Barring monopolization, the probability that a chain leading to the genesis block from a depth of i, that is the ith block from the start of that chain, is not a consensus decreases extremely fast with i (in other words, the more steps one goes along the chain toward the genesis block, the higher the probability that the reached block is in a consensus). Hence, the cryptographic hashes may be viewed back from some depth i as a secure list of timestamps with a definite order in time. Moreover, the directed acyclic graph of all chains leading to the genesis block may be viewed as defining a partial ordering on the set of timestamps, regardless of monopolization. For multiple blockchains, possibly with cross-references, this graph may have multiple connected components when viewed as an undirected graph.

Given such a cryptographic timestamp service, one can make temporal arguments to be included in arguments S and T as desired. Given a non-temporal argument R, one kind of temporal argument one may construct is $R[-\infty, t]$, shown in FIG. 12 as node 1212 and indicating that R was communicated no later than some timestamp t, called the upper limit timestamp. This can be accomplished by placing R or a cryptographic hash H(R) in the service, which allows it to appear in a new block that hashes to some timestamp t. The temporal argument R[−∞, t] is verified by checking that R is valid and either R or H(R) appears in a block with timestamp t. This can be described as a cryptographic first-to-file system. Such temporal arguments and their relationships can be captured in a dependency diagram, as shown in FIG. 12.

A second kind of temporal argument one may construct is R[t, ∞], shown in FIG. 12 as node 1210 and indicating that R was communicated no earlier than some timestamp t, called the lower limit timestamp. This is accomplished by augmenting R with t. The temporal argument is verified by checking that R is valid and that t is a valid timestamp. This can be described as a cryptographic last-to-file system.

A third kind of temporal argument is $R[t_1, t_2]$ where $t_1 < t_2$, which may be interpreted as a logical-AND of $R[t_1, \infty]$ and $R[-\infty, t_2]$. This is shown in FIG. 12 as node 1214 and is well-defined only if $t_1$ and $t_2$ are comparable in the partial ordering, that is they appear along a common chain. Note that R[t, t] is infeasible, as then its containing block would be required to both include t and cryptographically hash to t, and that $R[t_2, t_1]$ where $t_1 < t_2$ is infeasible, as $t_2$ is infeasible to predict at the time the block with timestamp $t_1$ is added.

Temporal arguments allow making an argument of knowledge-at-a-time that is before, after or between times corresponding to timestamps. As a result, the temporal arguments themselves can be viewed as partially ordered in time (e.g., one temporal argument is ordered before another if the former has an upper limit timestamp ordered before the lower limit timestamp of the latter, if both exist, and otherwise the temporal arguments are not comparable). To the extent that timestamps involved are comparable, it is possible to construct arguments implying that message $M_1$ was communicated to user $A_1$ before message $M_2$ was communicated to user $A_2$. One may be able to make a stronger temporal argument by including a wall-clock time (or some other acceptable measure of time) as well in a temporal argument, as long as this time is valid, e.g. it is within the time range defined by the associated upper and lower limit timestamps.

Temporal arguments can also be nested. Since temporal arguments are also simply arguments, one can make a temporal argument on a temporal argument, resulting in a bitemporal argument. For example, $R[-\infty, t_1][t_2, \infty]$, shown in FIG. 12 as element 1216, argues that the argument that R was communicated no later than $t_1$ was communicated no earlier than $t_2$. The usefulness of this construct is more apparent when considering that each of the communications could be over a different channel. Note that $t_1$ and $t_2$ need not be comparable. Moreover, one may nest temporal arguments recursively, resulting in multitemporal arguments.

Figure 13:
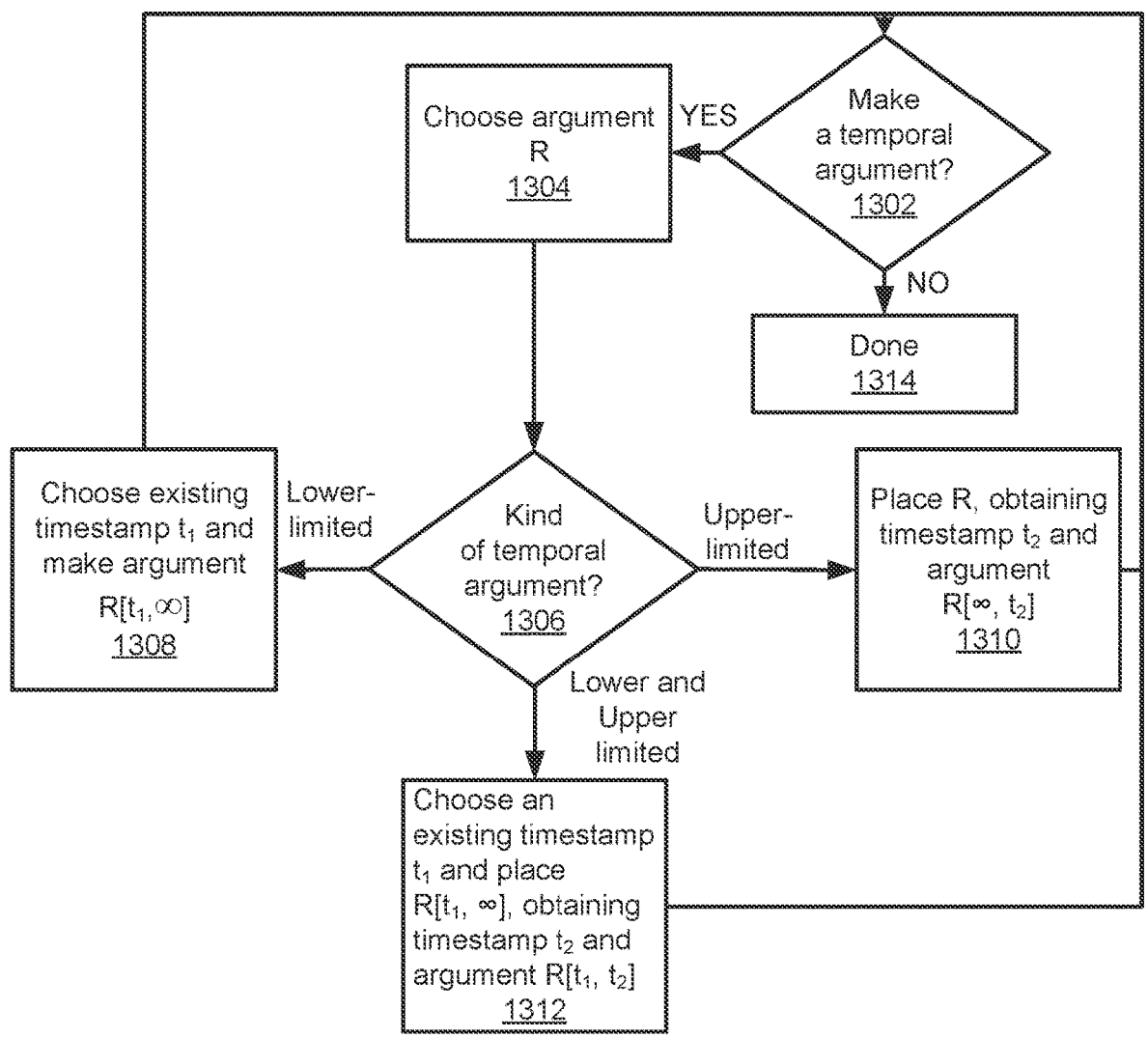
FIG. 13 is a flowchart corresponding to the example of FIG. 12.

FIG. 13 is a flowchart illustrating example operations that may be used to implement temporal arguments. In FIG. 13, the first user wishes to make a temporal argument (1302). If not possible or not available, then the process can end (1314).

Otherwise, a choice may be made for an argument R (1304), possibly an existing temporal one. The kind of temporal argument (1306) may be lower-limited (1308), in which case an existing timestamp $t_1$ may be chosen and argument $R[t_1, \infty]$ may be made.

For an upper-limited argument, place or otherwise file R on the blockchain to obtain a block with timestamp $t_2$ and argument $R[\infty, t_2]$ (1310). Otherwise, when choosing existing timestamps $t_1, t_2$, argument $R[t_1, t_2]$ may be made (1312). Finally in FIG. 13, for an upper-and-lower argument, choose an existing, pre-obtained $t_1$ and place argument $R[t_1, \infty]$ on the blockchain to obtain a block with timestamp $t_2$ and including an argument $R[t_1, t_2]$ (1312). As shown, completion of any of the operations 1308, 1310, or 1312 may return the process to operation 1302.

In additional or alternative embodiments, semantics of arguments, rather than being fixed, can be changed over time. For example, the semantics of arguments, e.g., the meaning of an argument and the inferences that can be drawn, may be made with a provision(s) for subsequent changes. In particular, arguments may be made with the provision to become weaker later on in a controlled way, as if fading.

Fading arguments can be constructed, for example, based on the types of deduction system discussed above. As described, such a deduction system allows a verifier to verify implicit arguments.

Since an implicit argument can pass verification at one point and later on fail verification, any explicit argument chained to it would fail verification later on too. Also, any explicit argument chained to a source argument, as also discussed above in the context of source arguments, would become increasingly ambiguous, e.g., because the source argument is chained to more arguments on identities. Moving from passing to failing verification status or increasing ambiguity of an argument is what defines a fading argument in such examples.

Fading arguments can be used in conjunction with cryptographic timestamp services, described above with respect to temporal arguments. In this case, one can also make an argument that includes a statement on the full history of the service, such that later on some argument may break, as described below. More generally, fading arguments can be constructed given implicit arguments that fail verification later on, as may be understood from the thirteenth example embodiment delineated above.

With respect to the types of fading arguments just referenced, it may be appreciated that, for a given application/scenario, it may not make sense to rely on a deduction system lacking strong guarantees. Instead, a solution for fading arguments may be implemented that relies exclusively on cryptographic guarantees. That is, for the types of fading arguments just referenced, which are based on implicit arguments that fail verification later on, the following discussion demonstrates implicit arguments that, with cryptographic guarantees, fail verification later on.

In the following examples, the availability of a token ownership service, such as may be provided by various cryptocurrencies as described above, or provided otherwise, is assumed. Given such a service, the system 100 of FIG. 1 may be configured to track ownership of a signature-token. Specifically, each token k is associated with a signer. The signer is a party in possession of a secret key $sk_k$ that allows producing a signature $S_k(M)$ for a given message M. The corresponding public key $pk_k$ allows anyone to verify the signature $S_k(M)$ has been made by the signer.

When an arguer, who is not the signer (but who may be the signer in some implementations), holds ownership of a token k, the arguer is granted the right to obtain a blind signature $S_k(M)$ from the signer for any message M as long as ownership is maintained. Blind signatures are a well-known cryptographic primitive. The signature being blind means the signer cannot later deny the signature but also has no memory of making it, for whom or when.

Each signature transaction is then verifiably communicated, along with an argument on the updated state of a cryptographic accumulator (a well-known primitive) maintaining the set of unblinded signatures of token k so far, without revealing any of them. With this, anyone can verify signature transactions, i.e., can verify that the signer produced the proper signature for the proper owner without knowing the message, and reject any other signatures with token k presented later on, since no one can argue that such a signature was incorporated in the corresponding accumulator. Note that since the token ownership service keeps full history of all transactions, anyone can verify these transactions at any time.

The arguer, who owns token k, requests a blind signature for a temporal argument of the form $R[t, \infty]$, where t is the timestamp when the request is made, as described above, e.g., with respect to FIGS. 12 and 13. The arguer privately unblinds the signature into $S_k(R[t, \infty])$. When one presents an anonymous (or pseudonymous, which should be understood to be covered by the term "anonymous" throughout the present description) argument of knowing $S_k(R[t, \infty])$ is valid, that is, along with a witness that the corresponding accumulator incorporates the signature, it shows that R was communicated no earlier than t and was signed while token k was owned, without revealing the signature or R. As long as the arguer holds ownership of token k, the arguer can anonymously convince anyone that, in addition, no one else could have obtained such a signature. When the arguer relinquishes ownership of token k and more signature transactions using token k are verifiably communicated, this is no longer true. Instead, now there is more than one potential owner since t. The more such potential owners, the weaker the argument becomes, as if fading. Moreover, due to anonymity, it is possible to control the fading process by repeatedly transferring ownership of token k to several anonymous identities controlled by the same party. Fading can be made quite effective in systems with many identities and tokens.

It may be observed that an argument can be one that includes a statement S on ownership of token t. This is because this condition can be expressed using AOKM, described above, and includable in the key manifest 132. Assuming this argument was verifiable at some point in time, fading of that token may lead to some verification failing later on.

To clarify, consider an argument made using AOKM at timestamp t. As described, AOKM requires a witness w and an input x to produce an argument of form "I know w such that S is satisfied given x". In this example, w is an unblinded version of the signature provided by the signer of token k with timestamp t, along with evidence the signature was incorporated in the cryptographic accumulator of k. Then, x is the full service history in consensus up to timestamp t including history of states of all cryptographic accumulators, and S is a statement that identity A owns token k at timestamp t, and that the unblinded signature is valid for token k.

This argument has the form $R[t, \infty]$, since, as the full history grows, x remains a prefix at timestamp t of it and the argument remains valid. For the argument W of knowing the secret key of identity A, argument $R[t, \infty]$ implies W (i.e., W is implicit in the argument) as long as identity A holds on to token k. In this case, the party making the AOKM argument convinces it knows the secret key of identity A. When identity A relinquishes token k and more signature transactions using token k are verifiably communicated, the implication does not work and the argument W fails verification thereafter. This is because now some other identity B could also have made the AOKM argument. If other arguments of implications from W were made, their implications too fail verification thereafter.

Generally, using fading arguments in conjunction with a token ownership service, one can argue the ownership of another argument and later on fade the ownership argument. Also, one can make an argument that includes a statement on ownership of a token, and later on break an argument entirely. Moreover, such arguments can be made with cryptographic guarantees.

In further embodiments, the shared channel 104 of FIG. 1, as referenced above, should be considered to represent, in some implementations, two or more shared channels. For all such shared channels, it is assumed for each that all communicating users observe all communications on the shared channel in question. Then, when multiple channels are considered, each communication may be on a separate channel and observed by a specific group of communicating users that are on that shared channel.

By way of notation, in the following $C_i$ is used to denote the ith channel, and $U_i$ is used to denote the set of users observing that channel, and $U_M$ is used to denote the set of recipients of M. Then, argument S may occur on channel $C_1$ and argument T on channel $C_2$. Verifiable communication of M is only experienced by users with access to both $C_1$ and $C_2$, that is, by $U_1 \cap U_2$. Users with access to $C_1$ only, that is $U_1 \setminus U_2$, or to $C_2$ only, that is $U_2 \setminus U_1$, do not experience verifiable communication. If a recipient $U \in U_M$ has access to $C_1$ only, or if U has access only to $C_2$ and sk is (initially) unknown to U, then U does not experience communication at all. If user $A_1$ made argument S and has access to $C_1$ only, then any user in $U_2$ can make argument T on channel $C_2$ that verifiably communicates M to $U_1 \cap U_2$ without user $A_1$ or any in $U_1 \setminus U_2$ having knowledge thereof.

A similar analysis applies to communication commitments, which are discussed above. For example, an argument S communicated first on $C_1$ is a commitment to receive from $U_1$. An argument T communicated first on $C_2$ is a commitment to send to $U_2$. The argument communicated second is a delivery on the commitment, but only to $U_1 \cap U_2$.

Embodiments using multiple shared channels can also be generalized to the types of argument chains discussed above. For example, for arguments $R_i$ for i=1, ..., k and k>1 where $R_1 = S[sk_1]$ and $R_i = T[sk_{i-1}, sk_i]$ for i=2, ..., k and $sk_k = M$, the ith argument may be communicated on channel $C_i$. The shared channels may or may not be pairwise distinct. Then, verifiable communication of M is only experienced by $\cap U_i$, the set of users observing all $C_i$ channels.

Multiple channel embodiments can be generalized or extended to various other embodiments described herein. For example, with respect to entangled communication, each path on the directed graph described there defines a chain of arguments along the path's edges (see, e.g., FIGS. 10 and 11). Thus, the above analysis for a chain of arguments on multiple channels applies to each.

In the various multi-channel embodiments just described or referenced, it is assumed that a pair (or more) of channels has a common set of users that have access to both (or more). In such scenarios, verifiable communication may be restricted to taking place on one channel. In the following discussion, verifiable communication taking place across channels, referred to as channel coordination, is explicitly described.

Such channel coordination is implemented in the following example. Specifically, for channels $C_i$ with observing users $U_i$, coordinating $C_1$ and $C_2$ means that a user in $U_1 \cap U_2$ can communicate coordination arguments, each in response to a query for a regular argument R (or arguments) from a user in $U_1 \backslash U_2$ or $U_2 \backslash U_1$. The user making the query is a recipient; however, note that other users may be recipients if they observe the response on some channel. The response need only be communicated on a channel that is observed by a recipient, e.g., a simple choice is $C_2$ or $C_1$ respectively. The coordination arguments enable a recipient to verify regular arguments, which they could not observe directly, that were communicated on $C_2$ or $C_1$ respectively.

Thus, a coordination verification process is provided, and implemented using the verifier 102 of FIG. 1 to verify across multiple channels, which works by verifying a coordination argument against a small amount of authentication data. Without such a process, a user who observes only one of $C_1$, $C_2$ would not be able to ensure R was verifiably communicated on the unobserved channel, even if each regular argument that was communicated on each of the channels was verifiably communicated there.

However, verifiable coordination does not mean that all regular arguments are coordinated on both channels; it only means that some, e.g., those queried for, are. A coordination argument for R on $C_1$ accepted by the coordination verification process, to be described in detail below, implies that R was communicated on $C_2$, and similarly for $C_1$ and $C_2$ swapped.

Thus, in addition to an argument communicated on one channel, arguments with identical content may be communicated on one or more channels. To distinguish between the communications, the jth regular argument communicated on channel $C_i$ may be denoted by $R_{i,j}$. The argument $R_{i,j}$, be it of type S or of type T, may be associated with a secret key $sk_{i,j}$ and a corresponding public key $pk_{i,j}$ (the one used in communication verification of $R_{i,j}$).

For the present discussion, a cryptographic timestamp service, as discussed above, may be assumed to be available for securely establishing consensus on the order of regular arguments on each channel. One instance of the service may serve one or more channels. A precondition to enabling verifiable coordination of a given set of channels is an instance of the service common to at least these channels, and it is assumed for simplicity of the present example that the transactions placed on such a service include all $R_{i,j}$ arguments.

In the example, an authenticated data structure $F_x$ (such as one based on well-known authenticated file systems) mapping keys to values, is maintained for each service X. Here, the purpose of $F_x$ is to authenticate the existence of a given argument in the structure. Each key in $F_x$ is a distinct address key ak that corresponds to some public key pk, and hence also some secret key sk; for example, ak=pk or ak=H(pk) for some cryptographic hash function H. This allows all arguments included in $F_x$ and associated with a common sk to be located using the corresponding pk, without knowing sk, as discussed below. The value associated with this key is an authenticated data structure $D_{ak}$ of transaction references (e.g., a block hash, or some other reference to the block, and an index, or some other reference to a transaction within the block) in X, each including an argument $R_{i,j}$ such that ak=$ak_{i,j}$, where $ak_{i,j}$ corresponds to $pk_{i,j}$. Versions of the root hash of $F_x$ are placed in X by users observing arguments on a channel serviced by X, where each version of $F_x$ extends a former with one or more additional such arguments. A block with an improper version, that is one that does not reflect the actual arguments that were verifiably communicated on such a channel, e.g. one that a dishonest user attempted to add to X, would be rejected (from becoming a consensus) by other honest users of X. The latest version of the root hash of $F_x$ is the only authentication data needed to authenticate a response to a query against $F_x$ for arguments associated with some pk, as described below.

The coordination verification process uses the authenticated data structure $F_x$. Verifying that an argument $R_{i,j}$ observed on C, was communicated as some $R_{i',j'}$ on $C_{i'}$, where $C_i$ and $C_{i'}$ are both served by X, is done as follows. First, compute ak=$ak_{i,j}$. Next, authenticate against $F_x$ a retrieval, possibly from a user in $U_i$, of (the root hash of) $D_{ak}$. Then, authenticate against $D_{ak}$ a retrieval, possibly from a user in $U_{i'}$, of a reference to a transaction including an argument identical to $R_{i,j}$.

A response to a retrieval may be dishonest, and so in general this query results in a reference to a transaction including some argument $R_{i',j''}$. Finally, check that $R_{i,j}$=$R_{i',j''}$. If these steps succeed, the coordination verification process accepts. The last step can be modified to retrieve some or all arguments referenced by $D_{ak}$, which may be useful in some cases. For example, one may wish to retrieve using ak all type T arguments with implications from knowing sk, possibly to continue with retrieving more arguments associated with the knowledges implied from sk, effectively traversing the knowledge diagram corresponding to X. Therefore, one may, but need not, know any arguments-to-be-retrieved prior to querying for them. Also, in other examples, multiple queries may be sent, each to a different user. Only one of the responses needs to authenticate successfully for the querying user to learn (from verifying the response coordination argument) the proper arguments that were verifiably communicated on an unobserved channel.

Further, the above examples relate to a distributed $F_x$, so that all $D_{ak}$ structures in $F_x$ may be scattered and kept by many users. In other implementations, a two-step authentication, against $F_x$ and $D_{ak}$, is not mandatory. Instead, it is possible to authenticate directly against $F_x$ that is held by a centralized service.

In the context of the multiple coordinated channels just described, coordination networks may arise from an interaction of multiple instances of coordinated channels. For example, from multiple timestamp services, each serving multiple channels, a coordination network may be built.

In this regard, it is possible for a channel be served by more than one service. A channel served by two or more services can be used to relay coordination arguments between the services.

As an example of this, channels $C_1$, $C_2$ may be served by service $X_1$ and channels $C_2$, $C_3$ by service $X_2$. $O_{i,j,k}$ may then represent a coordination argument for service $X_k$ made on channel $C_i$ and corresponding to regular argument $R_{i,j}$. Then, any user in U can make such an argument. If $R_{1,j}$=$R_{2,j'}$ for some j, j' and in the case where the coordination arguments $O_{1,j,1}$ and then $Q_{2,j',2}$ are made, then the former can be made by any user in $U_1$ and verified by any user in $U_2$, while the latter can be made by any user in $U_2$, who learns $R_{1,j}$ from $O_{1,j,1}$, and verified by any user in $U_3$, who learns $R_{2,j'}$ from $O_{2,j',2}$. Consequently, verifiable coordination is relayed from $X_1$ to $X_2$. Generally, one can relay along paths in the undirected bipartite graph having a node per channel and per service and having an edge between a channel node and a service node if the associated channel is served by the associated service.

Very large coordination networks can be engineered. For example, they can be built incrementally by adding channels and services for them. Moreover, since users have a discretion as to whether to respond to a query for a regular argument R, it is also possible to keep R private to a service X, e.g. provided that users on X cooperate to this effect, or even to a user, e.g. provided it keeps R private behind a secret key. Hence, coordination networks can be built modularly, exposing only certain information outside a coordination network module.

It is also possible to build a coordination network for simple, rather than verifiable, communication. In such examples, each service defines an order only on its own transactions. Using temporal arguments, and in particular nested temporal (or multitemporal) arguments that refer to timestamps of more than one service, a partial order on all transactions across all services may be obtained. This partial order then becomes tighter as the more arguments made on a channel are temporal arguments having more lower- and upper-limiting timestamps associated with more services serving this channel.

Figure 14:
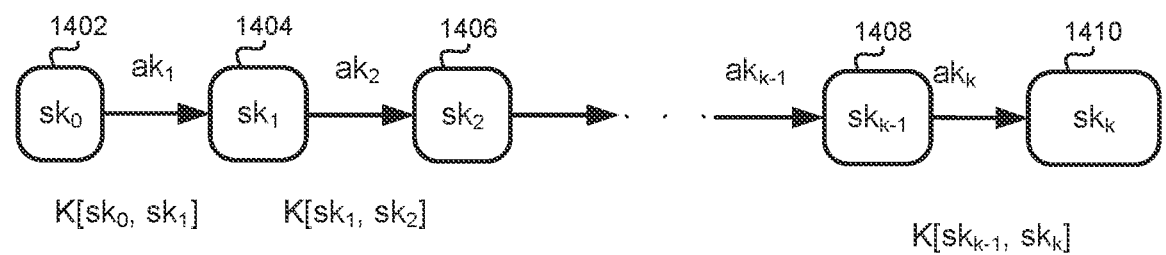
FIG. 14 is a block diagram of a lifecycle diagram for knowledge tokens used in the system of FIG. 1.
Figure 15:
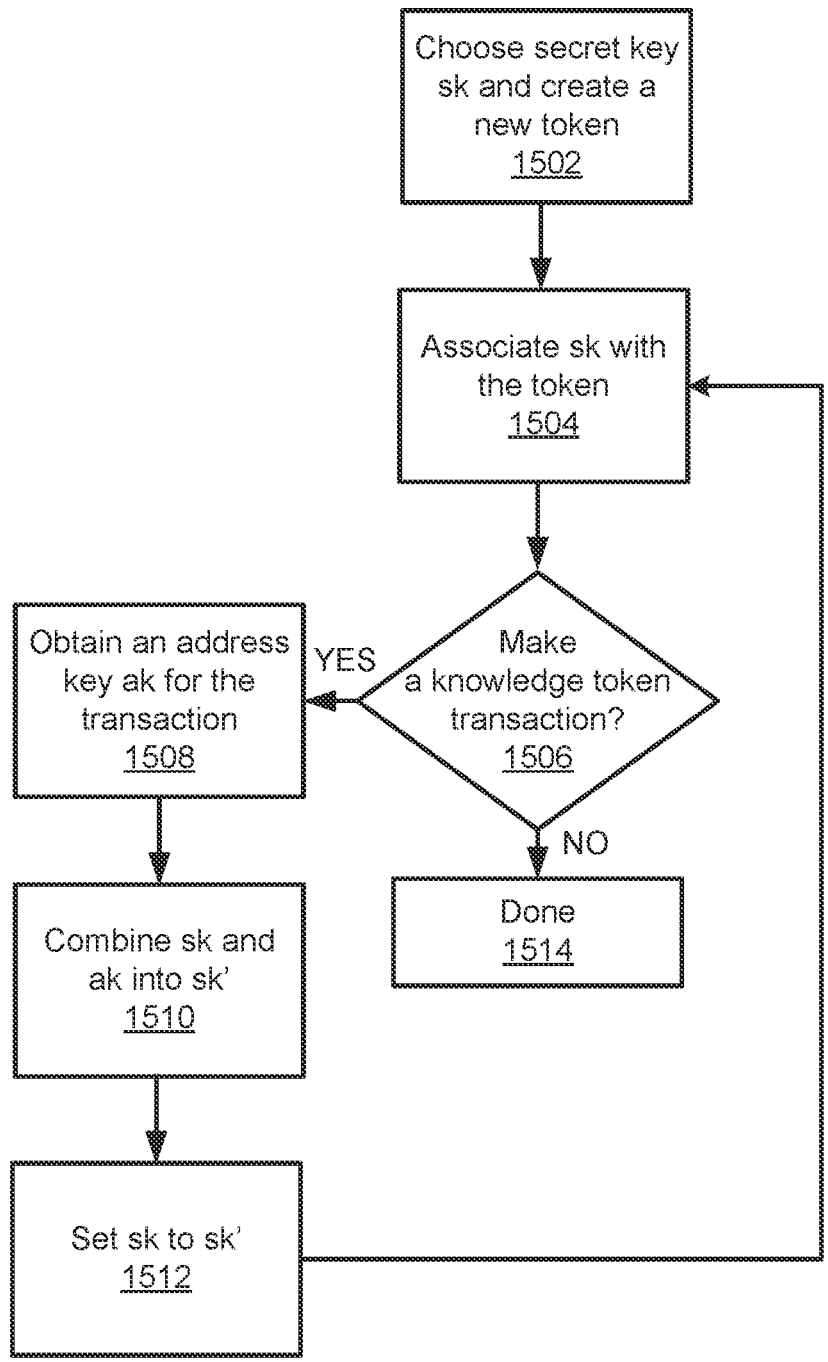
FIG. 15 is a flowchart illustrating example implementations of the knowledge tokens of FIG. 14.

FIG. 14 is a block diagram of a lifecycle diagram for knowledge tokens by way of example, and FIG. 15 is a flowchart illustrating example implementations of the knowledge tokens of FIG. 14. In this context, knowledge tokens enable modeling ownership and the transfer of ownership using knowledge. A knowledge token system is built on the use of implicit arguments and argument chains, both discussed above. Communicating users are assumed to observe all communications on the shared channel 104 as described herein. Moreover, also described above, a cryptographic timestamp service may be used to establish consensus on the order of communications.

In the example, a knowledge token is characterized by some knowledge and an exclusive owner of the knowledge. Such knowledge can arise, for example, in one of two ways: either by an S argument with a random (uniquely known) sk or by an implicit argument. The former creates a new knowledge token owned by some party, and the latter transfers its ownership.

In an example of a simple knowledge token system, it may occur that all know that user A knows a satisfying $g^a = y$ and user B knows b' satisfying $g^{b'} = z$, both over G where g, y, z, G are given. As discussed herein (e.g., in the thirteenth example embodiment for constructing S and/or T, above), when user A verifiably communicates a to user B, anyone can verify user B knows b for $g^b = yz$. So, user A has made b known to user B, without knowing b, and all users can verify that. This is a verifiable knowledge transaction.

The rules of this system, which are verifiable by all users, state that when this transaction completes, a is void, no longer representing ownership, and b is in force, now representing new ownership. If the transaction fails, due to verifiable communication failing, the rules state that a is still in force, and b is not even recognized as a was not verifiably communicated.

Though the knowledge changes, the system views this transaction as transferring a distinct knowledge token K, which, before the transaction, was associated with knowledge a and owner A, and after the transaction, is associated with knowledge b and owner B. User B may now transfer this knowledge token to another user, which would result in a new knowledge and a new owner associated with K.

Such a transfer can be viewed as an edge, in the example labeled with K[a, b], in a graph with nodes corresponding to owners. A knowledge token K moves along a path in this graph with consecutive edges K[a, b], K[c, d] having b=c. By following the rules of this system, any user observing the transactions can track token ownership.

In this simple system just outlined, a first kind of knowledge is of a and of b, and is referred to as key knowledge. Such knowledge must have been associated with a knowledge token K at some point in time. Of all such key knowledges of K, only the last one is in force, and the rest are void.

A second kind of knowledge, that of b', is an address knowledge. It allows a user, in this case user B, to receive K at an address represented by the knowledge of b'. Any user can create a new address by simply making a type S argument.

To create a knowledge token, the system defines a proof-of-work problem. For example, such a problem may include a blockchain proof-of-work problem, where the problem is to find a nonce such that the hash of a block of several recent transactions has a particular bit pattern. Alternatively, it could include a problem that is more useful to mankind to have solved. Moreover, the problem may include the solver's PKI private key, making the problem specific to each user, as one way to avoid races between users to solve the same problem.

Generally, the problem should be unpredictable and differ from one transaction to another. User A is entitled to a knowledge token when communicating an argument of knowledge of a solution to the problem augmented with an argument of knowledge of some a; a new knowledge token is created associated with key knowledge a and owner A. If useful, for example to associate some value with the token, the problem or aspects thereof may also be associated with the token.

Many other knowledge token systems are possible. For example, the key and address knowledges can be argued using a hard problem other than discrete logarithm, or by some other type of argument. Complex arguments, discussed above, can be employed to set up many other computational problems, in which case implicit arguments would be deduced differently.

In a second example, more than one key knowledge can become void or come into force through one transaction. This can be defined in rules of the system for handling multiple edges triggered by an entangled communication transaction, such as those described above.

In a third example, knowledge transactions can be augmented with additional requirements or effects. This can be defined in rules of the system for handling a complex argument, discussed above, that is augmented to the communication.

A transaction can be engineered in many ways. It may be engineered to fail unless multiple authorizing signatures are included in it. It may be engineered to account for a proof-of-work problem, or some other type of argument, associated with the token, for example to compensate the solver better for solving a more difficult problem. It could also be engineered to affect a transfer of value, failing on insufficient funds, though this requires consensus on transactions order as may be obtained from, e.g., a cryptographic timestamp service.

As a final example, the rules for handling a given transaction can be encoded in the communication of the transaction itself, assuming a language for specifying such rules is defined. A knowledge token can be blessed with essentially any rights granted to its owner. It could be a cryptocoin with some value, or it could be some smart asset, or some other right. The rights themselves may but need not be represented by the knowledge token system; it is sufficient for rights to be respected by system participants or have legal force to be useful. Moreover, a knowledge transaction can be configured to bless each of the tokens it leaves upon completion with any rights as well.

FIG. 14 is a block diagram illustrating a lifecycle diagram of a knowledge token in the example knowledge token system described above. In FIG. 14, each node 1402-1410 is labeled with, and corresponds to, a key knowledge, and each intervening edge is labeled with an address knowledge and corresponds to a knowledge token transaction, whose label appears below the corresponding edge, to that address.

At start, the token is associated with the source key knowledge, corresponding to the edge's source, and with an owner who knows it. At end, the token is associated with the target key knowledge, corresponding to the edge's target, and with an owner who knows it. Due to the transaction, the edge's address key knowledge and the source key knowledge, which becomes void, combine to produce the target key knowledge, which comes into force. The manner in which this combination is determined depends on the way these knowledges are argued, e.g. using the discrete logarithm problem in the above example.

FIG. 15 is a flowchart illustrating example implementations of FIG. 14. In the example of FIG. 15, a secret key sk is obtained/chosen and a new token is created (1502), and the secret key is associated with the token (1504).

If a subsequent transaction is not a knowledge token transaction, the process may end (1506, 1514). For a knowledge token transaction to proceed (1506), an address key ak for the transaction is obtained (1508), sk and ak are combined into sk' (1510), sk is set to sk' (1512), and the process returns to operation (1504), as shown.

In the present description, it is generally assumed that known or future cryptographic techniques are available and sufficient to provide desired levels of security. Nonetheless, an argument built using any single cryptographic method may in principle be compromised by a future attack that breaks the method. Thus, if necessary or desired to enhance security, dispersed arguments may be used. In this context, a dispersed argument refers to an argument composed of multiple shares, each built using a different cryptographic method, such that one can recover the knowledge only if one knows at least a certain number of shares. By way of notation, in the following, formulas with a free subscript i apply for all $i \in \{1, \ldots, k\}$.

For a t-dispersed argument of knowledge of some sk, first, a secret sharing method (e.g., the well-known Shamir secret sharing method, alone or in combination with the well-known Rabin's Information Dispersal Algorithm (IDA)) is used to disperse sk over the shares $s_1, \ldots, s_k$. Second, an argument $S_i$ of knowledge of $s_i$ using an independent cryptographic method is computed. In this context, independence means the event of breaking one cryptographic method is essentially independent of that of another's.

Then, an argument T, that knowledge of at least t shares implies the knowledge of sk with the same secret sharing method, is computed. Then, we make the argument $R=(S_1, \ldots, S_k, T)$. Thus, this example(s) provides a verifiable communication of the dispersion, without revealing the shares.

As an example, consider the case where k=2, t=2 and $S_1$, $S_2$ rely on RSA cryptosystem and Lamport signature respectively, as described above. If at some point in the future the RSA cryptosystem is broken, but Lamport signature remains intact, then although $S_1$ is now compromised since now anyone could have recovered $s_1$, the argument R is still valid due to $S_2$ being good. In other words, now the number of compromised shares c is 1, so c<t which is sufficient for verification. A dispersed argument can be made for virtually any argument, not just for an argument of knowing sk. For example, a recursively dispersed argument may be made.

Note that dispersion may be used even when only one cryptographic method is used for all shares; in this case, the dispersion protects against the breaking of a certain number of specific shares (rather than the breaking of the method).

In practice, dispersed arguments can be made with whatever and as many cryptographic methods as needed or desired. The choice of t, k affects at least security, computational complexity, argument size, and availability of the shared secret. To maximize security, one may maximize t. To maximize availability one may maximize k. A choice of t=k corresponds to an All-Or-Nothing-Transform, a well-known concept. That of t<k can be useful when shares are scattered over multiple, possibly coordinated, channels. In this case t channels need to be available for verifiable communication of such a t-scattered argument. To compromise the shared secret one would need to compromise shares in several channels, not just several cryptographic methods. Moreover, in this scenario, it may be possible to repair the compromise of fewer than t shares using well-known methods of proactive secret sharing, provided shares can be updated.

The following provides examples of various use case scenarios, some of which are referenced above, but none of which should be considered limiting or exhaustive of possible uses of the example embodiments described herein (or variations thereof). For example, the system 100 may be used to provide a notice of legal service having been made, which cannot (feasibly) be refuted by the recipient. Specifically, such an application of verifiable communication enables obtaining a guarantee that a recipient party may be served a communication at any time. In other words, the recipient party cannot delay or deny being served. Once an argument S with respect to the recipient has been made, which may be mandated once, any other party may now verifiably communicate an argument T that guarantees the recipient party now knows a message, possibly satisfying some properties as discussed w.r.t. FIGS. 7-9, and therefore has been served (e.g., with a legal notice such as a court order, or any other document or delivery for which a sending party wishes to confirm receipt).

Some implementations involve and enable verifiable trading of virtual goods, or digital artifacts, in exchange for some form of payment or for other virtual goods. An advantage here is that anyone can confirm that the exchange has taken place, without knowing the content of the virtual good. For example, one could enter into an exchange of some amount of credit (e.g., financial credit, implemented using standard credit card or cryptocurrency transactions) for a photo taken and owned by another person. Complex arguments, described above, could provide transaction guarantees whereby all or none of the following have occurred: the intended funds were available and have been transferred as intended, the intended photo has been delivered as intended, and anyone can verify this without knowing the photo, and if so configured, also without knowing the amount or identity of the persons involved. As the photo remains unknown to others, it can be resold, often a desirable outcome. The decentralized verification, which obviates the need for a trusted third-party, is particularly advantageous. Moreover, by using entangled communication, described with respect to FIGS. 10 and 11, one can incrementally set up multiparty transactions of virtual goods. Other non-limiting examples of virtual goods that can be handled by this application are documents or files, raw or derived data, audio or video recordings, virtual gaming artifacts, and many more.

In a further example, verifiable communication enables one to make an argument that some information is genuine.

In particular, suppose a company is offering to sell some analysis derived from its internal datasets; there is normally no guarantee that the information is genuine and not made up. Effectively, the buyer would need to trust the seller to some degree. However, using verifiable communication, the company would be able to make a verifiable argument that the communicated information is genuine without revealing the source datasets or requiring trust in itself. One way to do this is to make an argument stating the same information was communicated to other respectable companies, who have used a well-established method to process the same information and arrive at some published results that can be scrutinized. This way, the trust in the information being genuine is built on consensus. The decentralized verification, effectively obviates the need for a pre-established trust relationship between the recipient and sender. Other non-limiting examples of genuine information that can be handled by this application are medical information, insuree or insurance policy information, credit or loan information, quantified-self information, and many more.

In a further example, temporal arguments, using the last-to-file system described w.r.t. FIGS. 12 and 13, enable verifiable communication of overridable contracts, such as wills or contracts, that may be overridden with the signatures of multiple parties. In such scenarios, someone verifiably communicates to some trusted party (e.g., a person, business, or legal entity, or, in other examples, software designed to present the contract when it stops receiving live signals from its human operator) a cryptographically signed message stating one's will at some point in time. When timestamps involved are distinct and appear on the consensus chain, the last-to-file system guarantees the latest override prevails, since presenting a will with some timestamp nullifies all wills with earlier timestamps. Note that though one can implement overridable contracts using the first-to-file system, the costs associated with this solution may be higher, for example due to the cost of placing data on the blockchain. An advantage of verifiable communication for this application over simply signing a cryptographic contract is that the communication of the contract is known to all, even though the content of the contract may not be (although, in such embodiments, characteristics of the content changes in the latest version may be verifiably communicated without revealing the actual content changes, using the techniques of FIGS. 7-9). Using this system it becomes infeasible to deny existence, and temporal last-to-file properties, of a successfully communicated contract. One may also apply this to non-overridable contracts. Fading arguments, and crypto-fading arguments, described above can be used to implement a right-to-be-forgotten to be exercised. In some circumstances, this can be accomplished without the need to trust a third party or rely on the law to enforce it. By verifiably communicating a fading argument, a party is in a position to convince anyone of ownership of the argument. For example, a person could anonymously and verifiably communicate an argument that includes a proprietary photo and hold on to the ownership token associated with it. As long as the token is held, the person can convince anyone that the anonymous identity owning the token is the originator of the photo (e.g., by arguing knowing a valid unblinded signature for it, as described above). To have the ownership of the photo forgotten, the person fades the associated argument so no one can link the identity, or the person, to the photo. The right-to-be-forgotten application can be extended to multiple parties and to multiple ownerships in a natural way. One can also chain other arguments, corresponding to other ownerships, to a fading argument in order to have them forgotten as well upon fading.

In further applications of fading arguments, and of crypto-fading arguments, enables a party to exercise a right-to-revoke, in some circumstances, without the need to trust a third party or rely on the law to enforce it. This application can be described as a modification of the right-to-be-forgotten application just described where the party owning the token and that owning the unblinded signature may be distinct. The token owner is in a position to fade the associated argument, thereby revoking the signature owner's ability to convince anyone of ownership of the argument. The token owner may also undo a revocation, that is reinstate, by issuing a new (e.g. with the latest available timestamp) signature to the same signature owner. The right-to-revoke application can be extended to multiple parties and to multiple ownerships similarly. One can also chain other arguments to a fading argument in order to have them revoked as well upon fading similarly.

To implement ledger networks in an example embodiment, the above-described coordination networks may be used to resolve scalability problems inherent in a ledger solution based on a cryptographic timestamp service such as blockchain. This scalability problems stem from the inherent conflict between low (average) proof-of-work time and low probability of abandoning a new block. Lowering proof-of-work time allows less time for a new block to propagate through the network, and consequently to increase the probability that some network node would work on generating a block chained to an older one. Hence more generated blocks would be rejected by blockchain nodes and more computational effort would be wasted.

Currently, proof-of-work time in BitCoin is set to about 10 minutes. Waste significantly increases when proof-of-work time is significantly less than this due to less complete network propagation. To resolve the scalability issue, a coordination network may be built, where each service hosts its own ledger, which can be much smaller in size, with much fewer nodes, much lower network propagation time, much lower proof-of-work time, and much lower probability of a new block being rejected, compared to a global ledger. Taking this to the extreme results in a ledger per party with essentially no waste. The network coordination, which is maintained separately from the ledgers, results in a consistent state of all ledgers taken together.

For a cryptographic timestamp service that addresses this scalability problem by reducing the waste, scalability issues may stem from the restriction that only one node generates a block at a given time. Even if transactions originators can determine that node and route transactions to it, the overall system production rate is limited by the capacity of a single node (If a designated node has a significant portion of the overall capacity, perhaps because it is backed by a large resource pool, then the overall system is concentrated and its integrity is degraded, which is a worse problem than the original scalability one.). The scalability issue can be resolved by building a coordination network, where capacity of many nodes may be utilized concurrently, since coordination can be performed as a separate process.

In the case where the ledgers model an economy, or otherwise a system where the order of transactions between accounts matters, one way to structure the network is using compartments, each managing a distinct set of accounts in a ledger, and using coordination when value is transferred across compartment boundaries. One can also subdivide compartments recursively, such that a sub-compartment appears as an account in its super-compartment. This structure is consistent with the way individual accounts are managed at a bank level and inter-bank balances are managed in another level. Moreover, it may be possible to optimize this structure to minimize (actual or expected) cross-compartment coordination. Other modular network structures are possible as well.

In versions of the preceding embodiments, knowledge tokens and entangled communication may be used. The former enables implementing the ledgers using knowledge tokens, with the various verifiable communication capabilities associated with it, and the latter enables setting up highly complex transactions within such ledgers in a distributed and modular way.

In further use case scenarios relating to the use of ledgers, higher-order arguments may be used to enable secure compression of a ledger, maintaining its integrity. One way to do it is by making a checkpoint argument on balances of accounts. By making a checkpoint argument verifying the current balances of a set of accounts, using as inputs at least one previous checkpoint argument and transaction arguments for each account since its checkpoint, one may convince that the current checkpoint balances are valid. Using complex arguments, a checkpoint may also include additional verifications, such as for the amount of transaction data that was included in the checkpoint, to enhance security or other features. With this method, a checkpoint argument is one order higher than the previous checkpoint. If a previous checkpoint does not exist, so the current checkpoint is the first one, then initially a zero balance may be assumed for all accounts included in it. When a checkpoint becomes a consensus, one may discard records of transaction arguments included in it, and thus compress the ledger. This is effectively a process of verifiable communication of clearance and settlement. It can also be applied to multiple channels using coordination networks described above, where a checkpoint includes balances of accounts managed in the channel it is argued in, as referenced herein.

In example implementations of verifiable relaying, coordination networks enable verifiable communication across a relay, that may be subject to failures or is otherwise untrusted. An example is verifiable emailing, where traditionally the relay points include the email servers of the sender and recipient. In some cases, such as in mix networks (which are well-known), many more servers may be involved. With a coordination network handling such an email, parties can get a credible proof-of-receipt without the recipient being able to deny it, even if the relay crosses multiple channels, while maintaining security against interception or altering by third-parties.

In an example implementations for verifiable auctions, entangled communication and coordination networks may be used to enable organizing an auction that is anonymous, fair, secure, verifiable, and trustless, potentially across multiple channels, in a modular way. In non-limiting examples, the auction coordinator organizes the auction as an entangled communication transaction. The auction is set up such that a bid by each of the participants is verifiably communicated, requiring knowledge of a corresponding bid key. This key is secretly communicated to the auction coordinator, who then verifiably communicates it, requiring the knowledge of a common auction key. The auction coordinator affects the transaction by verifiably communicating the common auction key. To avoid letting the auction coordinator know the bids, it may be sufficient to secure the bids using a key known to the participants only; alternatively, knowledge tokens may be used such that the auction coordinator communicates unknown bid keys. Note that participants may join an auction until it is closed, that is its transaction is affected, which is often desirable. Further, since entangled communication transactions can be nested, one may organize a nesting verifiable auction, where each bid may be sourced from a nested verifiable auction.

In yet another example implementation, knowledge tokens may be used to restore a forgotten secret key from a restoration service, without the service knowing the secret key. In the example, first, a user chooses an address key ak. To save, the user chooses a restoration key rk, computes a secret key sk as the combination of rk, ak as defined by the knowledge token system being employed, and communicates rk possibly openly to the service along with an identifier. In some cases rk and the identifier can be the same, and easy to recall. Suppose the user forgets sk. To restore sk, the user requests the service to perform a restoration for the same identifier. In response, the service verifiably communicates rk. Consequently, only the user learns sk and anyone can verify this. Therefore, the restoration service may charge (or otherwise be credited) for its service while greatly reducing risks of disputes. One may enhance this application by using multiple restoration services, where the restoration key rk may be replicated or dispersed (e.g., using the dispersed arguments referenced herein) across them, using a one-to-many or a many-to-one or a many-to-many relationship between restoration keys and secret keys as defined by the knowledge token system being employed, and using multiple channels such that any channel may be used for each rk or dispersed shares thereof. A web-of-trust like setup, where each user restores for its friends, is another option. It is also possible to use entangled communication to wrap together multiple restorations in one transaction.

In a final example implementation, a secure, globally distributed database may be provided using the system 100 of FIG. 1. For example, an extension of those of ledger compression and ledger networks, described above, enables implementing a secure distributed database, e.g., a globally distributed database, capable of hosting extreme amounts of data on nodes physically located throughout the global network, while maintaining data security and integrity.

The state of the database is modified using transactions. Each transaction is expressed as one or more arguments, possibly chained or entangled, that are verifiably communicated on one or more channels and coordinated to one or more other channels. For data distribution, each channel handles transactions for a part of the state, and any overlap in handling is coordinated between the channels. For data availability, a part may be handled by geographically dispersed channels. Moreover, it may be possible to optimize this structure, such as to minimize coordination. Therefore, data security may be provided by the cryptography of the arguments, and support for extreme amounts of data may be provided by a modular coordination network.

Arguments may be made as lower-and-upper-limited multitemporal ones, so the corresponding transactions may be comparable in a partial ordering in time. With this partial ordering, transactions may be recognized as conflicting when their order of application to the state matters and they are not comparable in the partial ordering. A transaction is allowed to enter the consensus only when verifiers can determine that no such conflict exist or could later occur, which is guaranteed when the latest timestamp (or time) in consensus for each handling channel has advanced beyond the corresponding upper-limit timestamp (or time) associated with the transaction for the same channel. When no such conflict is possible, transactions may be applied to the state in the order defined by the partial ordering, which is well-defined for such transactions. Therefore, data integrity may be provided by rejecting any potential conflicts.

Implementations of the various techniques described herein may be implemented in digital electronic circuitry, or in computer hardware, firmware, software, or in combinations of them. Implementations may implemented as a computer program product, i.e., a computer program tangibly embodied in a non-transitory information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

In addition to the just-referenced use of known computing resources, it may be appreciated that future techniques may be used to implement the various embodiments described herein, and variations thereof. For example, quantum computing devices may be used as partial or complete replacements for the various computing systems just described.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer program product including instructions recorded on a non-transitory computer readable storage medium and configured, when executed by at least one computing device, to cause the at least one computing device to:
    at a verifier participating in a network via one or more shared channels:
    receive one or more state updates to one or more ledgers, where the updates are ordered at least partially;
    determine a first state update encoding one or more verifiable properties of a secret key, including ownership of the secret key by an owning entity; determine a second state update encoding one or more verifiable properties of access enablement to a secret information, including a reference of the owning entity;
    and verify the first state update, including the ownership of the secret key, and the second state update, including the reference of the owning entity, to conclude access enablement for the owning entity to the secret information.

2. The computer program product of claim 1, wherein the instructions, when executed, are further configured to cause the at least one computing device to:
    at the verifier, performing at least one of the following:
        determine a partial ordering on the state updates using timestamps;
        verify the first state update is synchronized, via the one or more shared channels, to be in an agreement with a second node participating in the network;
        apply rules to the state updates to determine their effect, including at least one right granted or revoked; and
        determine any state updates that are relevant to a stakeholder.

3. The computer program product of claim 1, wherein the instructions, when executed, are further configured to cause the at least one computing device to:

at the verifier:
  determine an entity using the first state update;
  participate in the network via a sub-network in which the entity operates; and
  synchronize the second state update to participants of the sub-network.

4. The computer program product of claim 1, wherein the instructions, when executed, are further configured to cause the at least one computing device to:
at the verifier, perform at least one of the following:
  coordinate a set of state updates determined in a first sub-network of the network to a second sub-network of the network, to modularly build a coordination network;
  determine a first partial order on state updates determined in the first sub-network and a second partial order on state updates determined in the second sub-network, where the partial orders agree on the ordering of the set of state updates; and
  scale the coordination of sub-networks to a globally distributed database with partitions covering the one or more ledgers, while maintaining data security and integrity.

5. The computer program product of claim 1, wherein the instructions, when executed, are further configured to cause the at least one computing device to:
at the verifier:
  interpret the state updates as forming a directed graph structure having at least one edge corresponding to a verifiable property encoded in a source state update and involving a target state update; and
  enable incremental and modular construction of the directed graph structure.

6. The computer program product of claim 1, wherein the instructions, when executed, are further configured to cause the at least one computing device to:
at the verifier, perform at least one of the following:
  verify the reference of the owning entity using a public key;
  verify the ownership of the secret key is of an owning entity that is operating in the network;
  verify the ownership using a cryptographic argument or a digital signature corresponding to the secret key; and
  verify the ownership using application of rules.

7. The computer program product of claim 1, wherein the instructions, when executed, are further configured to cause the at least one computing device to:
at the verifier, perform at least one of the following:
  verify the access enablement using application of access control rules;
  enforce the access enablement using cryptography, software, or hardware means for protecting secrets; and
  determine an entity and information to be accessible to the entity following the verification of a transaction.

8. A computer implemented method performed by a verifier, wherein the verifier is implemented by at least one hardware processor, participating in a network via one or more shared channels, the method comprising:
  receiving one or more state updates to one or more ledgers, where the updates are ordered at least partially;
  determining a first state update encoding one or more verifiable properties of a secret key, including ownership of the secret key by an owning entity;
  determining a second state update encoding one or more verifiable properties of access enablement to a secret information, including a reference of the owning entity; and
  verifying the first state update, including the ownership of the secret key, and the second state update, including the reference of the owning entity, to conclude access enablement for the owning entity to the secret information.

9. The method of claim 8 further comprising at least one of:
  determining a partial ordering on the state updates using timestamps;
  verifying the first state update is synchronized, via the one or more shared channels, to be in an agreement with a second node participating in the network;
  applying rules to the state updates to determine their effect, including at least one right granted or revoked; and
  determining any state updates that are relevant to a stakeholder.

10. The method of claim 8 further comprising:
  determining an entity using the first state update;
  participating in the network via a sub-network in which the entity operates; and
  synchronizing the second state update to participants of the sub-network.

11. The method of claim 8 further comprising at least one of the following:
  coordinating a set of state updates determined in a first sub-network of the network to a second sub-network of the network, to modularly build a coordination network;
  determining a first partial order on state updates determined in the first sub-network and a second partial order on state updates determined in the second sub-network, where the partial orders agree on the ordering of the set of state updates; and
  scaling the coordination of sub-networks to a globally distributed database with partitions covering the one or more ledgers, while maintaining data security and integrity.

12. The method of claim 8 further comprising:
  interpreting the state updates as forming a directed graph structure having at least one edge corresponding to a verifiable property encoded in a source state update and involving a target state update;
  enabling incremental and modular construction of the directed graph structure.

13. The method of claim 8 further comprising at least one of the following:
  verifying the reference of the owning entity using a public key;
  verifying the ownership of the secret key is of an owning entity that is operating in the network;
  verifying the ownership using a cryptographic argument or a digital signature corresponding to the secret key; and
  verifying the ownership using application of rules.

14. The method of claim 8 further comprising performing at least one of the following:
  verifying the access enablement using application of access control rules;
  enforcing the access enablement using cryptography, software, or hardware means for protecting secrets; and
  determining an entity and information to be accessible to the entity following the verification of a transaction.

15. A verifier system participating in a network, via one or more shared channels, and including at least one non-transitory computer readable storage medium and at least one processor configured to execute instructions stored using the at least one non-transitory computer readable storage medium, the verifier system further comprising:
   a channel monitor configured to cause the at least one processor to receive one or more state updates to one or more ledgers, where the updates are ordered at least partially;
   a key manifest interpreter configured to cause the at least one processor to determine a first state update encoding one or more verifiable properties of a secret key, including ownership of the secret key by an owning entity;
   a message manifest interpreter configured to cause the at least one processor to determine a second state update encoding one or more verifiable properties of access enablement to a secret information, including a reference of the owning entity;
   a manifest comparator configured to cause the at least one processor to verify the first state update, including the ownership of the secret key, and the second state update, including the reference of the owning entity, to conclude access enablement for the owning entity to the secret information; wherein the channel monitor, the key manifest interpreter; the message manifest interpreter and the manifest comparator are implemented using the at least one processor.

16. The verifier system of claim 15 further comprising at least one of:
   the manifest comparator configured to cause the at least one processor to determine a partial ordering on the state updates using timestamps;
   the key manifest interpreter configured to cause the at least one processor to verify the first state update is synchronized, via the one or more shared channels, to be in an agreement with a second node participating in the network;
   the manifest comparator configured to cause the at least one processor to apply rules to the state updates to determine their effect, including at least one right granted or revoked; and
   the manifest comparator configured to cause the at least one processor to determine any state updates that are relevant to a stakeholder.

17. The verifier system of claim 15 further comprising:
   the key manifest interpreter configured to cause the at least one processor to determine an entity using the first state update;
   the message manifest interpreter configured to cause the at least one processor to participate in the network via a sub-network in which the entity operates; and
   the manifest comparator configured to cause the at least one processor to synchronize the second state update to participants of the sub-network.

18. The verifier system of claim 15 wherein the manifest comparator is further configured to cause the at least one processor to perform at least one of the following:
   coordinate a set of state updates determined in a first sub-network of the network to a second sub-network of the network, to modularly build a coordination network;
   determine a first partial order on state updates determined in the first sub-network and a second partial order on state updates determined in the second sub-network, where the partial orders agree on the ordering of the set of state updates; and
   scale the coordination of sub-networks to a globally distributed database with partitions covering the one or more ledgers, while maintaining data security and integrity.

19. The verifier system of claim 15 wherein the manifest comparator is further configured to cause the at least one processor to:
   interpret the state updates as forming a directed graph structure having at least one edge corresponding to a verifiable property encoded in a source state update and involving a target state update; and
   enable incremental and modular construction of the directed graph structure.

20. The verifier system of claim 15 further comprising at least one of the following:
   the key manifest interpreter configured to cause the at least one processor to verify the reference of the owning entity using a public key;
   the message manifest interpreter configured to cause the at least one processor to verify the ownership of the secret key is of an owning entity that is operating in the network;
   the key manifest interpreter configured to cause the at least one processor to verify the ownership using a cryptographic argument or a digital signature corresponding to the secret key; and
   the key manifest interpreter configured to cause the at least one processor to verify the ownership using application of rules.

21. The verifier system of claim 15 wherein the manifest comparator is further configured to cause the at least one processor to perform at least one of the following:
   the manifest comparator configured to cause the at least one processor to verify the access enablement using application of access control rules;
   the manifest comparator configured to cause the at least one processor to enforce the access enablement using cryptography, software, or hardware means for protecting secrets; and
   the manifest comparator configured to cause the at least one processor to determine an entity and information to be accessible to the entity following the verification of a transaction.

* * * * *